United States Patent
Inoshita

(10) Patent No.: US 10,837,386 B2
(45) Date of Patent: Nov. 17, 2020

(54) EXHAUST PURIFICATION SYSTEM OF INTERNAL COMBUSTION ENGINE

(71) Applicant: TOYOTA JIDOSHA KABUSHIKI KAISHA, Toyota (JP)

(72) Inventor: Kenji Inoshita, Okazaki (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 279 days.

(21) Appl. No.: 15/994,764

(22) Filed: May 31, 2018

(65) Prior Publication Data

US 2018/0347489 A1 Dec. 6, 2018

(30) Foreign Application Priority Data

Jun. 2, 2017 (JP) .................................. 2017-110433

(51) Int. Cl.
| | |
|---|---|
| *F01N 11/00* | (2006.01) |
| *F02D 41/14* | (2006.01) |
| *F02D 41/02* | (2006.01) |
| *B01D 53/94* | (2006.01) |
| *F02D 41/00* | (2006.01) |

(52) U.S. Cl.
CPC ....... *F02D 41/0295* (2013.01); *B01D 53/944* (2013.01); *B01D 53/9495* (2013.01); *F01N 11/00* (2013.01); *F02D 41/0052* (2013.01); *F02D 41/1441* (2013.01); *F01N 2550/02* (2013.01); *F02D 41/0072* (2013.01); *F02D 2200/0814* (2013.01)

(58) Field of Classification Search
CPC ... B01D 53/944; B01D 53/9495; F01N 11/00; F01N 2550/02; F02D 2200/0814; F02D 41/0052; F02D 41/0072; F02D 41/0295; F02D 41/1441
See application file for complete search history.

(56) References Cited

U.S. PATENT DOCUMENTS

| | | | | |
|---|---|---|---|---|
| 6,101,999 | A * | 8/2000 | Ohashi | ................... F01N 3/0842 123/295 |
| 2001/0054416 | A1* | 12/2001 | Yoshizaki | ........... F02D 41/0057 123/568.12 |
| 2002/0083701 | A1* | 7/2002 | Igarashi | ................ B60W 20/00 60/284 |

(Continued)

FOREIGN PATENT DOCUMENTS

WO WO 2012/056515 A1 5/2012

*Primary Examiner* — Phutthiwat Wongwian
*Assistant Examiner* — Diem T Tran
(74) *Attorney, Agent, or Firm* — Finnegan, Henderson, Farabow, Garrett & Dunner, LLP

(57) ABSTRACT

The exhaust purification system of an internal combustion engine has: exhaust purification catalysts 20, 24 arranged in an exhaust passage and able to store oxygen; and a control device 31 for calculating an EGR rate of intake gas supplied to combustion chambers 5 and for controlling an air-fuel ratio of the exhaust gas flowing into the catalysts. The control device alternately switches the air-fuel ratio between a rich air-fuel ratio and a lean air-fuel ratio, and controls the air-fuel ratio so that the air-fuel ratio is switched from the lean air-fuel ratio to the rich air-fuel ratio when the oxygen storage amount of the catalyst is greater, when the calculated EGR rate is relatively high, compared to when it is relatively low.

5 Claims, 18 Drawing Sheets

(56) References Cited

U.S. PATENT DOCUMENTS

2007/0065341 A1*  3/2007  Asanuma ................ F01N 3/085
                                                    422/62
2011/0289904 A1* 12/2011  Miyashita ............. F02D 41/126
                                                    60/278
2013/0206119 A1   8/2013  Ando et al.

* cited by examiner

EXHAUST PURIFICATION SYSTEM OF INTERNAL COMBUSTION ENGINE

TECHNICAL FIELD

The present invention relates to an exhaust purification system of an internal combustion engine.

BACKGROUND ART

Known in the past has been an exhaust purification system provided with an exhaust purification catalyst able to store oxygen in an exhaust passage of an internal combustion engine and controlling an air-fuel ratio of exhaust gas flowing into this exhaust purification catalyst (for example, PLT 1). In such an exhaust purification system, an air-fuel ratio output by an air-fuel ratio sensor arranged at an upstream side of the exhaust purification catalyst in the direction of flow of exhaust (output air-fuel ratio) is controlled so as to conform to a target air-fuel ratio.

In addition, the exhaust purification system described in PLT 1 comprises an exhaust gas recirculation (EGR) system supplying part of the exhaust gas to the combustion chambers again. The target air-fuel ratio is set so that the higher the ratio of the amount of EGR gas to the total amount of the intake gas taken into the combustion chambers (below, referred to as the "EGR rate"), the higher (lean side) the target air-fuel ratio. According to PLT 1, as a result, it is possible to control the air-fuel ratio of the exhaust gas flowing into the exhaust purification catalyst more accurately in accordance with the state of introduction of EGR gas.

CITATION LIST

Patent Literature

PLT 1: International Patent Publication WO2012/056515

SUMMARY OF INVENTION

Technical Problem

In this regard, the higher the EGR rate of intake gas supplied to the combustion chambers, the greater the amount of unburned hydrocarbons (HC) in the exhaust gas discharged from the combustion chambers. This is due to the fact that the higher the EGR rate, the slower the combustion in the combustion chambers and accordingly the greater the amount of unburned HC remaining in the combustion chambers. The unburned HC discharged from the combustion chambers is basically removed by oxidation at the exhaust purification catalyst. However, depending on the state of the exhaust gas flowing into the exhaust purification catalyst, part of the unburned HC will deposit on the catalyst precious metal of the exhaust purification catalyst, and cause the catalyst precious metal to fall in activity (below, such an action by unburned HC called "HC poisoning"). If HC poisoning occurs, the ability to remove the HC and $NO_X$ in the exhaust gas flowing into the exhaust purification catalyst drops.

In the exhaust purification system described in PLT 1, as explained above, the target air-fuel ratio is corrected so as to compensate for the deviation of the output of the air-fuel ratio sensor accompanying introduction of EGR gas. However, with such control, it is not possible to effectively suppress HC poisoning of the exhaust purification catalyst.

The present invention was made in consideration of the above issue and has as its object to suppress HC poisoning of the exhaust purification catalyst and maintain a high purification ability of an exhaust purification catalyst.

Solution to Problem

The present invention was made so as to solve the above problem and has as its gist the following.

(1) An exhaust purification system of an internal combustion engine, comprising: an exhaust purification catalyst arranged in an exhaust passage of the internal combustion engine and able to store oxygen; and a control device for calculating an EGR rate of intake gas supplied to a combustion chamber of the internal combustion engine and for controlling an air-fuel ratio of the exhaust gas flowing into the exhaust purification catalyst, wherein the control device is configured to:

alternately switch the air-fuel ratio of the exhaust gas flowing into the exhaust purification catalyst between a rich air-fuel ratio richer than the stoichiometric air-fuel ratio and a lean air-fuel ratio leaner than the stoichiometric air-fuel ratio; and control the air-fuel ratio of the exhaust gas flowing into the exhaust purification catalyst so that, in a predetermined EGR rate region where the concentration of HC discharged from the engine body becomes higher along with an increase of the EGR rate, the air-fuel ratio of the exhaust gas flowing into the exhaust purification catalyst is switched from the lean air-fuel ratio to the rich air-fuel ratio when the oxygen storage amount of the exhaust purification catalyst is greater, when the calculated EGR rate is relatively high, compared to when it is relatively low.

(2) The exhaust purification system of an internal combustion engine according to above (1), wherein the control device is configured to control the air-fuel ratio of the exhaust gas flowing into the exhaust purification catalyst so as to switch the air-fuel ratio of the exhaust gas flowing into the exhaust purification catalyst from the lean air-fuel ratio to the rich air-fuel ratio after the oxygen storage amount of the exhaust purification catalyst is greater, as the calculated EGR rate is higher, in the predetermined EGR rate region.

(3) The exhaust purification system of an internal combustion engine according to above (1) or (2), wherein the control device is configured to control the air-fuel ratio of the exhaust gas flowing into the exhaust purification catalyst so that the lean degree when the air-fuel ratio of the exhaust gas flowing into the exhaust purification catalyst is a lean air-fuel ratio is larger, when the calculated EGR rate is relatively high, compared to when it is relatively low, in the predetermined EGR rate region.

(4) The exhaust purification system of an internal combustion engine according to above (3), wherein the control device is configured to control the air-fuel ratio of the exhaust gas flowing into the exhaust purification catalyst so that the lean degree when the air-fuel ratio of the exhaust gas flowing into the exhaust purification catalyst is a lean air-fuel ratio is larger as the calculated EGR rate is higher, in the predetermined EGR rate region.

(5) The exhaust purification system of an internal combustion engine according to any one of above (1) to (4), wherein the control device is configured to control the air-fuel ratio of the exhaust gas flowing into the exhaust purification catalyst so that each duration time when the air-fuel ratio of the exhaust gas flowing into the exhaust purification catalyst is a lean air-fuel ratio is longer, when the calculated EGR rate is relatively high, compared to when it is relatively low, in the predetermined EGR rate region.

(6) An exhaust purification system of an internal combustion engine, comprising: an exhaust purification catalyst arranged in an exhaust passage of the internal combustion engine and able to store oxygen; and a control device for calculating an EGR rate of intake gas supplied to a combustion chamber of the internal combustion engine and for controlling an air-fuel ratio of the exhaust gas flowing into the exhaust purification catalyst, wherein the control device is configured to: control the air-fuel ratio of the exhaust gas flowing into the exhaust purification catalyst to the stoichiometric air-fuel ratio when the calculated EGR rate is lower than a predetermined reference EGR rate in a predetermined EGR rate region where the concentration of HC discharged from the engine body becomes higher along with an increase of the EGR rate; and control the air-fuel ratio of the exhaust gas flowing into the exhaust purification catalyst so as to alternately switch the air-fuel ratio of the exhaust gas flowing into the exhaust purification catalyst between a rich air-fuel ratio richer than the stoichiometric air-fuel ratio and a lean air-fuel ratio leaner than the stoichiometric air-fuel ratio, when the calculated EGR rate is equal to or greater than the predetermined reference EGR rate.

Advantageous Effect of Invention

According to the present invention, it is possible to suppress HC poisoning of the exhaust purification catalyst and maintain a high purification ability of the exhaust purification catalyst.

DESCRIPTION OF EMBODIMENTS

Figure 1:
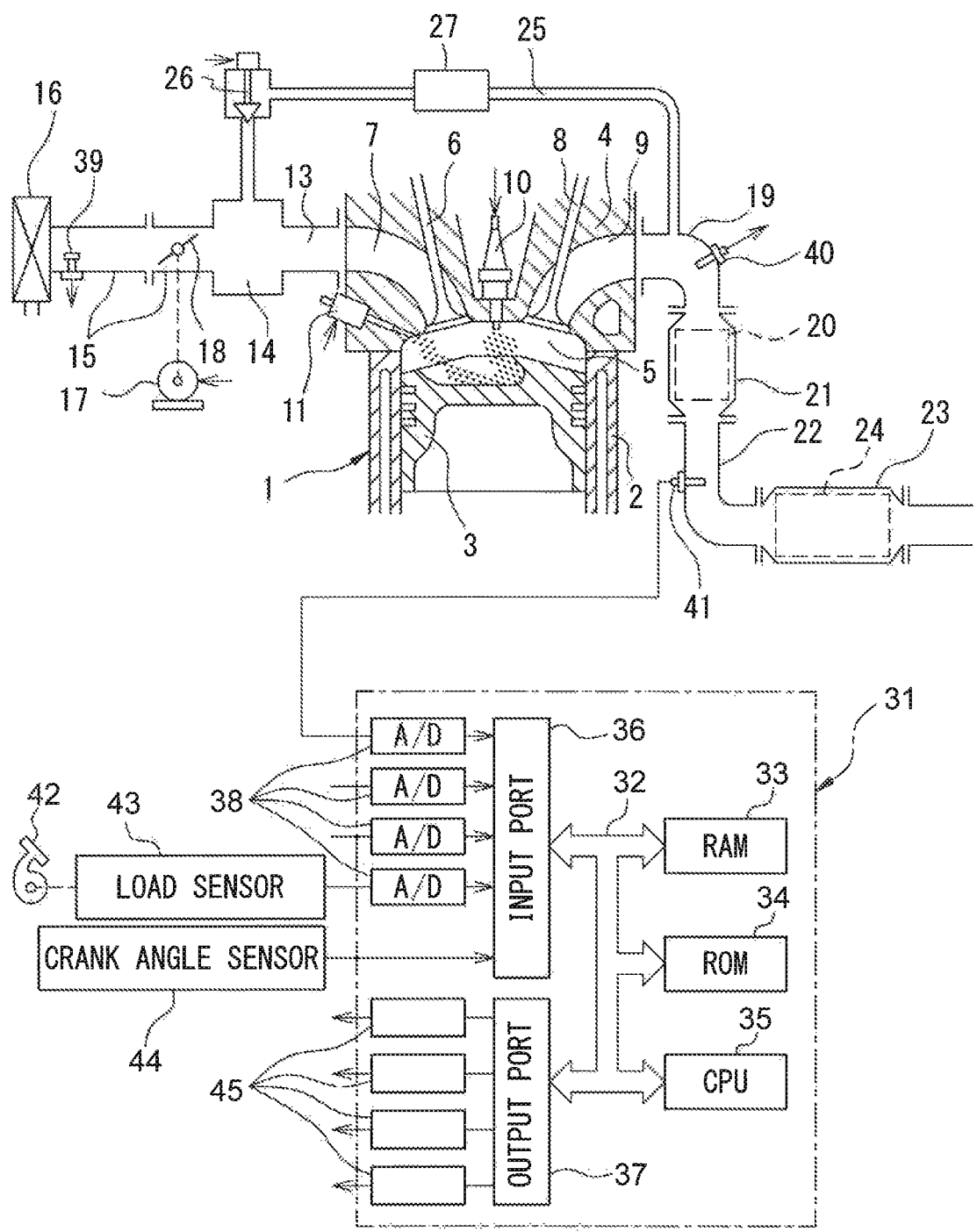
FIG. 1 is a view schematically showing an internal combustion engine in which an exhaust purification system according to first embodiment is used.

Below, referring to the drawings, embodiments of the present invention will be explained in detail. Note that, in the following explanation, similar component elements are assigned the same reference numerals.

First Embodiment

<<Explanation of Internal Combustion Engine as a Whole>>

FIG. 1 is a view which schematically shows an internal combustion engine in which an exhaust purification system according to a first embodiment of the present invention is used. Referring to FIG. 1, 1 indicates an engine body, 2 a cylinder block, 3 a piston which reciprocates inside the cylinder block 2, 4 a cylinder head which is fastened to the cylinder block 2, 5 a combustion chamber which is formed between the piston 3 and the cylinder head 4, 6 an intake valve, 7 an intake port, 8 an exhaust valve, and 9 an exhaust port. The intake valve 6 opens and closes the intake port 7, while the exhaust valve 8 opens and closes the exhaust port 9.

As shown in FIG. 1, a spark plug 10 is arranged at a center part of an inside wall surface of the cylinder head 4, while a fuel injector 11 is arranged at a side part of the inner wall surface of the cylinder head 4. The spark plug 10 is configured to generate a spark in accordance with an ignition signal. Further, the fuel injector 11 injects a predetermined amount of fuel into the combustion chamber 5 in accordance with an injection signal. Note that, the fuel injector 11 may also be arranged so as to inject fuel into the intake port 7. Further, in the present embodiment, gasoline with a stoichiometric air-fuel ratio of 14.6, is used as the fuel. However, the internal combustion engine using the exhaust purification system of the present invention may also use fuel other than gasoline, or mixed fuel with gasoline.

The intake port 7 of each cylinder is connected to a surge tank 14 through a corresponding intake runner 13, while the surge tank 14 is connected to an air cleaner 16 through an intake pipe 15. The intake port 7, intake runner 13, surge tank 14, and intake pipe 15 form an intake passage. Further, inside the intake pipe 15, a throttle valve 18 which is driven by a throttle valve drive actuator 17 is arranged. The throttle valve 18 can be operated by the throttle valve drive actuator 17 to thereby change the aperture area of the intake passage.

On the other hand, the exhaust port 9 of each cylinder is connected to an exhaust manifold 19. The exhaust manifold 19 has a plurality of runners which are connected to the exhaust ports 9 and a header at which these runners are collected. The header of the exhaust manifold 19 is connected to an upstream side casing 21 which houses an upstream side exhaust purification catalyst 20. The upstream side casing 21 is connected through an exhaust pipe 22 to a downstream side casing 23 which houses a downstream side exhaust purification catalyst 24. The exhaust port 9, exhaust manifold 19, upstream side casing 21, exhaust pipe 22, and downstream side casing 23 form an exhaust passage.

The exhaust manifold 19 and surge tank 14 are connected with each other through an exhaust gas recirculation (EGR) passage 25. In the EGR passage 25, an electrical control type EGR control valve 26 is arranged. Further, around the EGR passage 25, a cooling device 27 for cooling the EGR gas flowing through the EGR passage 25 is arranged. By adjusting the opening degree of the EGR control valve 26, it is possible to control the flow rate of the exhaust gas again supplied to the combustion chambers 5 and, as a result, possible to control the EGR rate of the intake gas taken into the combustion chambers 5. In this regard, the "EGR rate" means the ratio of the amount of EGR gas with respect to the total amount of the intake gas taken into the combustion chambers 5.

Note that, in the present embodiment, the opening degree of the EGR control valve 26 is adjusted to change the EGR rate of the intake gas. However, for example, if the valve timings of the intake valves 6 and the exhaust valves 8 are variable so as to make part of the exhaust gas flow in reverse once to the intake ports 7 and to make the exhaust gas flow again to the combustion chambers 5, it is also possible to change these valve timings so as to change the amount of exhaust gas flowing into the combustion chambers 5 again and thereby change the EGR rate.

The electronic control unit (ECU) 31 is comprised of a digital computer which is provided with components which are connected together through a bidirectional bus 32 such as a RAM (random access memory) 33, ROM (read only memory) 34, CPU (microprocessor) 35, input port 36, and output port 37. In the intake pipe 15, an air flow meter 39 is arranged for detecting the flow rate of air which flows through the intake pipe 15. The output of this air flow meter 39 is input through a corresponding AD converter 38 to the input port 36. Further, at the header of the exhaust manifold 19, an upstream side air-fuel ratio sensor 40 is arranged which detects the air-fuel ratio of the exhaust gas which flows through the inside of the exhaust manifold 19 (that is, the exhaust gas which flows into the upstream side exhaust purification catalyst 20). In addition, in the exhaust pipe 22, a downstream side air-fuel ratio sensor 41 is arranged which detects the air-fuel ratio of the exhaust gas which flows through the inside of the exhaust pipe 22 (that is, the exhaust gas which flows out from the upstream side exhaust purification catalyst 20 and flows into the downstream side exhaust purification catalyst 24). The outputs of these air-fuel ratio sensors 40 and 41 are also input through the corresponding AD converters 38 to the input port 36.

Figure 2:
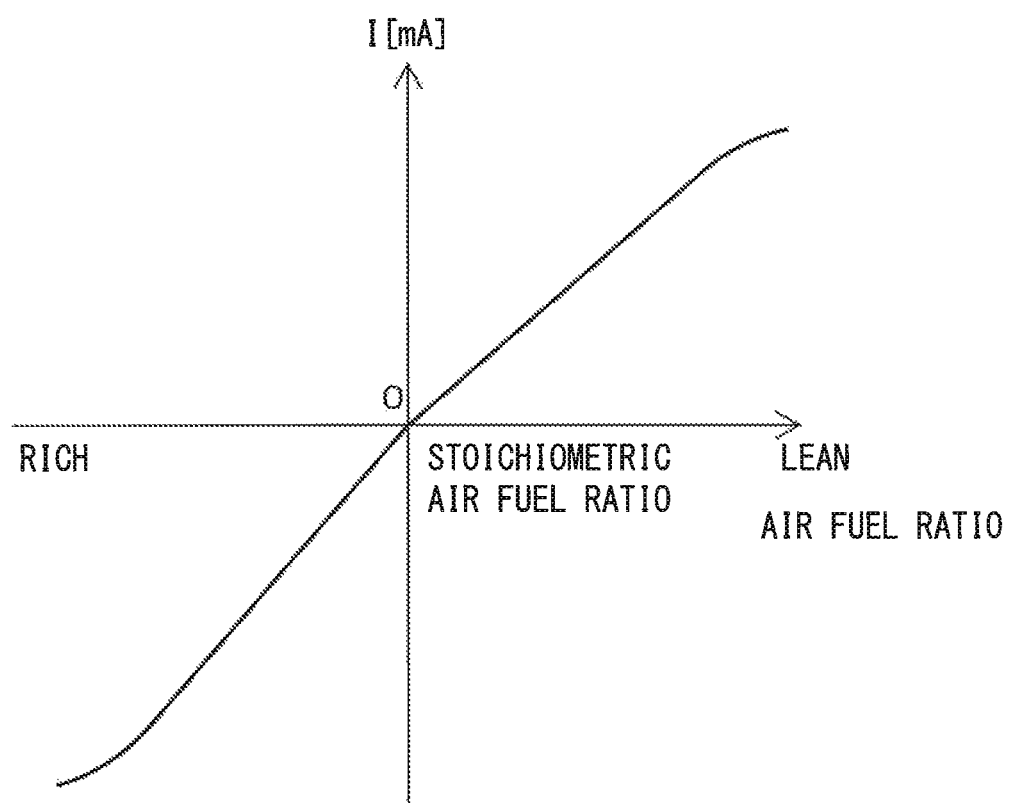
FIG. 2 is a view showing a relationship between an air-fuel ratio of exhaust gas around an air-fuel ratio sensor and an output current of the air-fuel ratio sensor.

In the present embodiment, limit current type air-fuel ratio sensors are used, as the air-fuel ratio sensors 40 and 41. Therefore, the air-fuel ratio sensors 40 and 41, as shown in FIG. 2, are configured so that the output currents from the air-fuel ratio sensors 40 and 41 are greater, as the air-fuel ratio of the exhaust gas around the air-fuel ratio sensors 40 and 41 is higher (i.e., is leaner). In particular, the air-fuel ratio sensors 40 and 41 of the present embodiment are configured so that the output currents linearly (proportionally) change with respect to the air-fuel ratio of the exhaust gas around the air-fuel ratio sensors 40 and 41. Note that, in the present embodiment, limit current type air-fuel ratio sensors are used as the air-fuel ratio sensors 40 and 41, but air-fuel ratio sensors other than limit current type air-fuel ratio sensors may also be used so long as the output of the sensors changes according to the air-fuel ratio of the exhaust gas. Such an air-fuel ratio sensor includes, for example, an oxygen sensor which sharply changes in output near the stoichiometric air-fuel ratio without applying voltage between the electrodes forming the sensor, etc.

Furthermore, in the exhaust purification system of the present embodiment, an $NO_X$ sensor 46 detecting the $NO_X$ concentration of the exhaust gas flowing through the inside of the exhaust pipe 22 is arranged in the exhaust pipe 22. Therefore, the $NO_X$ sensor 46 is arranged at the downstream side of the upstream side exhaust purification catalyst 20 in the direction of flow of exhaust, and detects the $NO_X$ concentration of the exhaust gas flowing out from the upstream side exhaust purification catalyst 20 and flowing into the downstream side exhaust purification catalyst 24. The $NO_X$ sensor 46 is configured so that its output is larger as the $NO_X$ concentration in the exhaust gas is higher. The output of the $NO_X$ sensor 46 is input through a corresponding AD converter 38 to the input port 36. Note that, the $NO_X$ sensor 46 may also be configured to be attached to the upstream side casing 21 to detect the $NO_X$ concentration in the upstream side exhaust purification catalyst 20.

Further, a load sensor 43 generating an output voltage proportional to the amount of depression of the accelerator pedal 42 is connected to the accelerator pedal 42. The output voltage of the load sensor 43 is input through a corresponding AD converter 38 to the input port 36. The crank angle sensor 44, for example, generates an output pulse every time the crank shaft rotates by 15 degrees. This output pulse is input to the input port 36. At the CPU 35, the engine speed is calculated from the output pulse of this crank angle sensor 44. On the other hand, the output port 37 is connected through corresponding drive circuits 45 to the spark plugs 10, fuel injectors 11, and throttle valve drive actuator 17. Note that, the ECU 31 functions as a control/diagnostic device for controlling the target air-fuel ratio of the exhaust gas flowing into the upstream side exhaust purification catalyst 20 and for diagnosing abnormality in the upstream side exhaust purification catalyst 20 based on the output of the $NO_X$ sensor 46.

The upstream side exhaust purification catalyst 20 and the downstream side exhaust purification catalyst 24 are three-way catalysts which have an oxygen storage ability. Specifically, the exhaust purification catalysts 20 and 24 are three-way catalysts which comprises a carrier made of ceramic on which a precious metal (for example, platinum Pt) having a catalyst effect and a substance having an oxygen storage ability (for example, ceria $CeO_2$) are carried. A three-way catalyst has the function of simultaneously purifying unburned HC, CO and $NO_X$ when the air-fuel ratio of the exhaust gas flowing into the three-way catalyst is maintained at the stoichiometric air-fuel ratio. In addition, when the exhaust purification catalysts 20 and 24 store a certain extent of oxygen, the unburned HC and CO and $NO_X$ are simultaneously purified even if the air-fuel ratio of the exhaust gas flowing into the exhaust purification catalysts 20 and 24 somewhat deviates from the stoichiometric air-fuel ratio to the rich side or lean side.

Accordingly, if the exhaust purification catalysts 20 and 24 have an oxygen storage ability, that is, if the oxygen storage amount of the exhaust purification catalysts 20 and 24 is less than the maximum storage oxygen amount, when the air-fuel ratio of the exhaust gas flowing into the exhaust purification catalysts 20, 24 is somewhat leaner than the stoichiometric air-fuel ratio, the excess oxygen contained in the exhaust gas is stored in the exhaust purification catalysts 20, 24. Therefore, the surfaces of the exhaust purification catalysts 20 and 24 are maintained at the stoichiometric air-fuel ratio. As a result, on the surfaces of the exhaust purification catalysts 20 and 24, the unburned HC, CO and $NO_X$ are simultaneously purified. At this time, the air-fuel ratio of the exhaust gas flowing out from the exhaust purification catalysts 20 and 24 is the stoichiometric air-fuel ratio.

On the other hand, if exhaust purification catalysts 20 and 24 can release oxygen, that is, the oxygen storage amount of the exhaust purification catalysts 20 and 24 is more than zero, when the air-fuel ratio of the exhaust gas flowing into the exhaust purification catalysts 20, 24 is somewhat richer than the stoichiometric air-fuel ratio, the oxygen which is insufficient for reducing the unburned HC and CO contained in the exhaust gas, is released from the exhaust purification catalysts 20 and 24. Therefore, the surfaces of the exhaust purification catalysts 20 and 24 are maintained at the stoichiometric air-fuel ratio. As a result, on the surfaces of the exhaust purification catalysts 20 and 24, the unburned HC, CO and $NO_X$ are simultaneously purified. At this time, the air-fuel ratio of the exhaust gas flowing out from the exhaust purification catalysts 20 and 24 is the stoichiometric air-fuel ratio.

In this way, when the exhaust purification catalysts 20 and 24 store a certain extent of oxygen, even if the air-fuel ratio of the exhaust gas flowing into the exhaust purification catalysts 20 and 24 deviates somewhat from the stoichiometric air-fuel ratio to the rich side or lean side, the unburned HC, CO and $NO_X$ are simultaneously purified and the air-fuel ratio of the exhaust gas flowing out from the exhaust purification catalysts 20 and 24 is the stoichiometric air-fuel ratio.

<<Basic Air-Fuel Ratio Control>>

Next, the basic air-fuel ratio control in the exhaust purification system of the internal combustion engine according to the present embodiment, will be summarized. In the air-fuel ratio control in the present embodiment, feedback control is performed based on the output air-fuel ratio of the upstream side air-fuel ratio sensor 40 to control the fuel injection amount from the fuel injector 11 so that the output air-fuel ratio of the upstream side air-fuel ratio sensor 40 becomes the target air-fuel ratio. That is, in the air-fuel ratio control in the present embodiment, feedback control is performed based on the output air-fuel ratio of the upstream side air-fuel ratio sensor 40 so that the air-fuel ratio of the exhaust gas flowing into the upstream side exhaust purification catalyst 20 becomes the target air-fuel ratio. Note that, the "output air-fuel ratio" means the air-fuel ratio which corresponds to the output value of the air-fuel ratio sensor.

Further, in the air-fuel ratio control of the present embodiment, target air-fuel ratio is set based on the output air-fuel ratio of the downstream side air-fuel ratio sensor 41, etc. Specifically, when the output air-fuel ratio of the downstream side air-fuel ratio sensor 41 becomes an air-fuel ratio richer than the stoichiometric air-fuel ratio (hereinafter, referred to as "rich air-fuel ratio"), the target air-fuel ratio is set to a lean set air-fuel ratio. As a result, the air-fuel ratio of exhaust gas flowing into the upstream side exhaust purification catalyst 20 also becomes the lean set air-fuel ratio. In this case, "lean set air-fuel ratio" is a predetermined constant air-fuel ratio which is leaner than the stoichiometric air-fuel ratio (air-fuel ratio serving as center of control) by a certain extent, and, for example, is 14.65 to 16 or so. In addition, in the present embodiment, when the output air-fuel ratio of the downstream side air-fuel ratio sensor 41 becomes equal to or less than a rich judged air-fuel ratio (for example, 14.55), which is slightly richer than the stoichiometric air-fuel ratio, it is judged that the output air-fuel ratio of the downstream side air-fuel ratio sensor 41 has become the rich air-fuel ratio.

If the target air-fuel ratio is changed to the lean set air-fuel ratio, the oxygen excess/deficiency of the exhaust gas which flows into the upstream side exhaust purification catalyst 20 is cumulatively added. The "oxygen excess/deficiency" means an amount of the oxygen which is excessive or the oxygen which is deficient (excess HC, CO, etc., (below, referred to as unburned gas)) when trying to make the air-fuel ratio of the exhaust gas which flows into the upstream side exhaust purification catalyst 20 the stoichiometric air-fuel ratio. In particular, when the target air-fuel ratio is the lean set air-fuel ratio, the exhaust gas which flows into the upstream side exhaust purification catalyst 20 is excessive in oxygen. This excess oxygen is stored in the upstream side exhaust purification catalyst 20. Therefore, the cumulative value of the oxygen excess/deficiency (below, also referred to as the "cumulative oxygen excess/deficiency") can be said to express the estimated value of the oxygen storage amount OSA of the upstream side exhaust purification catalyst 20.

Note that, the oxygen excess/deficiency is calculated based on the output air-fuel ratio of the upstream side air-fuel ratio sensor 40, and the estimated value of the intake air amount to the inside of the combustion chamber 5 which is calculated based on the output of the air flow meter 39, etc., or the fuel feed amount of the fuel injector 11, etc. Specifically, the oxygen excess/deficiency OED is, for example, calculated by the following formula (1):

$$OED=0.23 \times Qi \times (AFup-AFR) \qquad (1)$$

where 0.23 indicates the concentration of oxygen in the air, Qi indicates the amount of fuel injection, AFup indicates the output air-fuel ratio of the upstream side air-fuel ratio sensor 40, and AFR indicates an air-fuel ratio serving as control center (in the present embodiment, basically stoichiometric air-fuel ratio).

If the cumulative oxygen excess/deficiency acquired by cumulatively adding the thus calculated oxygen excess/deficiency becomes equal to or greater than the predetermined switching reference value (which corresponds to a predetermined switching reference storage amount Cref), the target air-fuel ratio which had up to then been the lean set air-fuel ratio is set to the rich set air-fuel ratio. The rich set air-fuel ratio is a predetermined air-fuel ratio which is a certain degree richer than the stoichiometric air-fuel ratio (the air-fuel ratio serving as control center), and is for example 12 to 14.55 or so.

Then, when the output air-fuel ratio of the downstream side air-fuel ratio sensor 41 again becomes equal to or less than the rich judged air-fuel ratio, the target air-fuel ratio is again made the lean set air-fuel ratio. Then, a similar operation is repeated. In this way, in the present embodiment, the target air-fuel ratio of the exhaust gas flowing into the upstream side exhaust purification catalyst 20 is alternately and repeatedly set to the lean set air-fuel ratio and the rich set air-fuel ratio. In other words, in the present embodiment, the air-fuel ratio of the exhaust gas flowing into the upstream side exhaust purification catalyst 20 is alternately switched between a rich air-fuel ratio and an air-fuel ratio leaner than the stoichiometric air-fuel ratio (hereinafter, referred to as "lean air-fuel ratio").

<<Explanation of Air Fuel Ratio Control Using Time Chart>>

Figure 3:
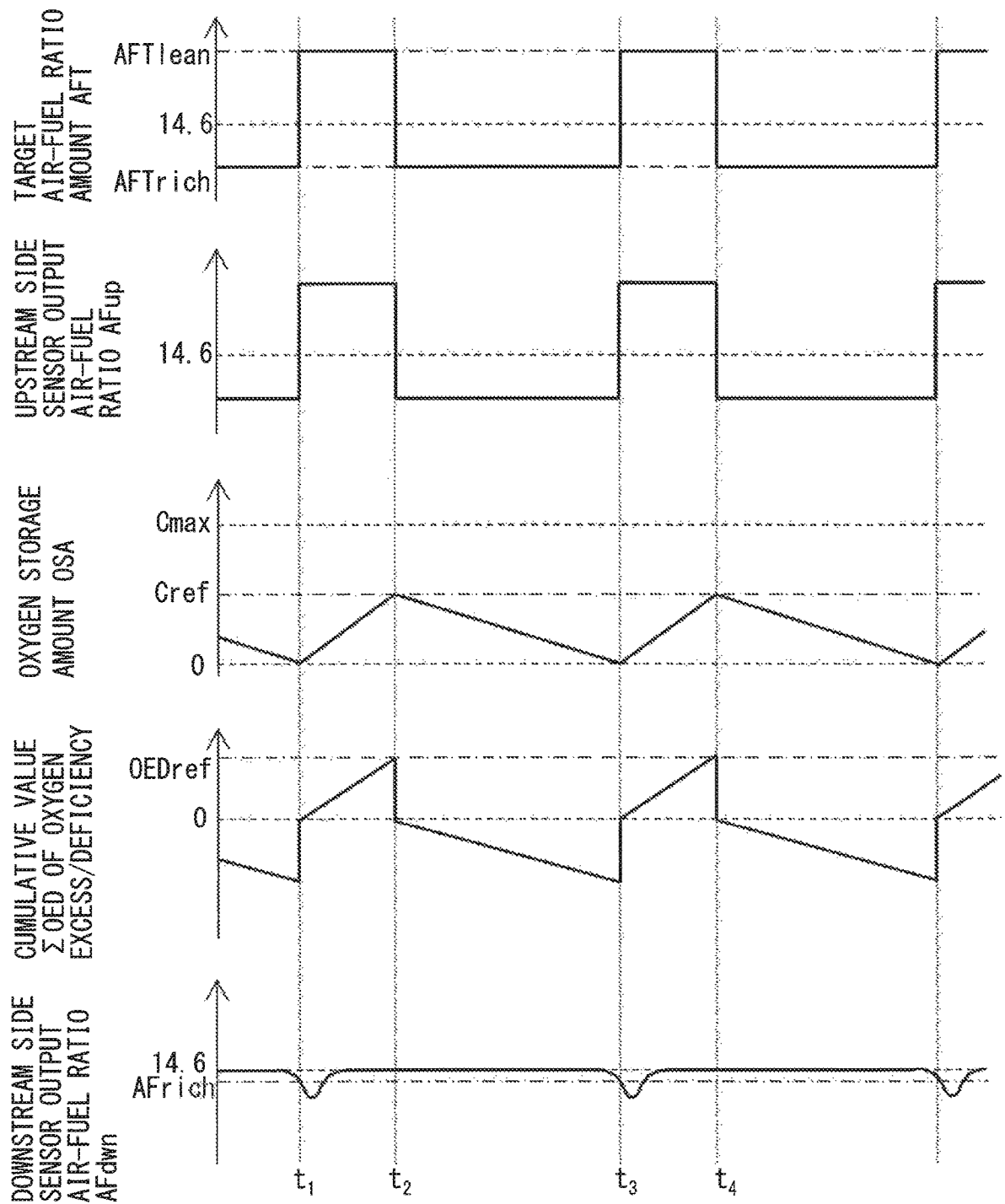
FIG. 3 is a time chart showing a change of an oxygen storage amount of an upstream side exhaust purification catalyst, etc., at the time of operation of an internal combustion engine.

Referring to FIG. 3, the operation explained as above will be explained in detail. FIG. 3 is a time chart of the target air-fuel ratio AFT, the output air-fuel ratio AFup of the upstream side air-fuel ratio sensor 40, the oxygen storage amount OSA of the upstream side exhaust purification catalyst 20, the cumulative oxygen excess/deficiency ΣOED, and the output air-fuel ratio AFdwn of the downstream side air-fuel ratio sensor 41, when performing the basic air-fuel ratio control of the present embodiment.

Figure 5:
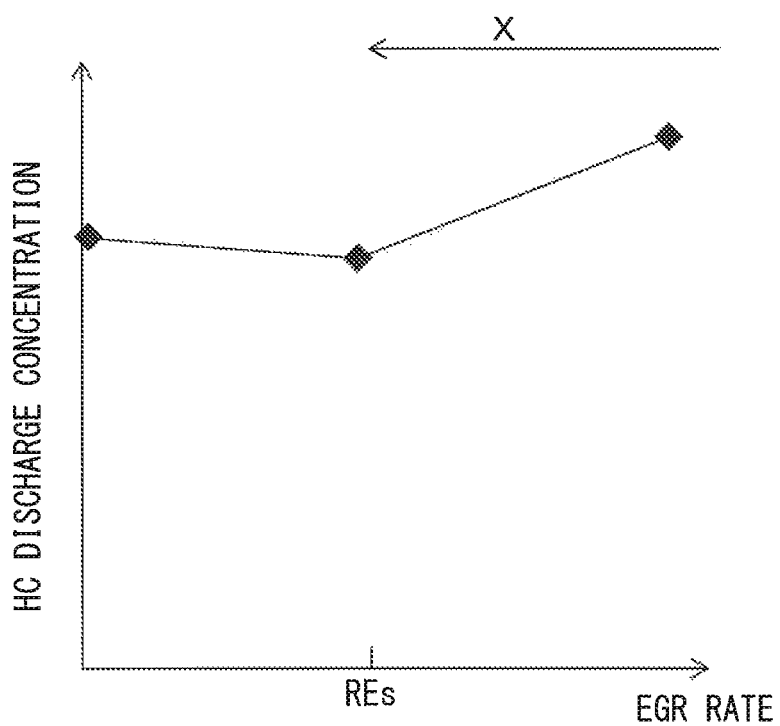
FIG. 5 is a view showing a relationship between the EGR rate and the concentrations of unburned HC and NOx.

In the example shown in FIG. 5, in the state before the time $t_1$, the target air-fuel ratio AFT is set to the rich set air-fuel ratio AFTrich, and therefore the output air-fuel ratio of the upstream side air-fuel ratio sensor 40 is the rich air-fuel ratio. Unburned gas, etc., contained in the exhaust gas flowing into the upstream side exhaust purification catalyst 20 is purified in the upstream side exhaust purification catalyst 20. Along with this, the oxygen storage amount OSA of the upstream side exhaust purification catalyst 20 gradually decreases. Since unburned gas is purified at the upstream side exhaust purification catalyst 20, the output air-fuel ratio AFdwn of the downstream side air-fuel ratio sensor 41 is substantially the stoichiometric air-fuel ratio.

If the oxygen storage amount OSA of the upstream side exhaust purification catalyst 20 gradually decreases, the oxygen storage amount OSA approaches zero. Along with this, a part of the unburned gas flowing into the upstream side exhaust purification catalyst 20 starts to flow out without being purified by the upstream side exhaust purification catalyst 20. As a result, the output air-fuel ratio AFdown of the downstream side air-fuel ratio sensor 41 gradually falls, and, at the time $t_1$, reaches the rich judged air-fuel ratio AFrich. In the present embodiment, if the output air-fuel ratio AFdwn of the downstream side air-fuel ratio sensor 41 becomes equal to or less than the rich judged air-fuel ratio AFrich, in order to make the oxygen storage amount OSA increase, the target air-fuel ratio AFT is switched to the lean set air-fuel ratio AFTlean. Further, at this time, the cumulative oxygen excess/deficiency ΣOED is reset to zero.

If switching the target air-fuel ratio to the lean air-fuel ratio at the time $t_1$, the air-fuel ratio of the exhaust gas flowing into the upstream side exhaust purification catalyst 20 changes from the rich air-fuel ratio to the lean air-fuel ratio. Therefore, after the time $t_1$, the oxygen storage amount OSA of the upstream side exhaust purification catalyst 20 increases. Similarly, the cumulative oxygen excess/deficiency ΣOED also gradually increases.

Therefore, the air-fuel ratio of the exhaust gas flowing out from the upstream side exhaust purification catalyst 20 changes to the stoichiometric air-fuel ratio, and the output air-fuel ratio AFdwn of the downstream side air-fuel ratio sensor 41 returns to the stoichiometric air-fuel ratio. At this time, the air-fuel ratio of the exhaust gas flowing into the upstream side exhaust purification catalyst 20 is the lean air-fuel ratio, but there is sufficient leeway in the oxygen storage ability of the upstream side exhaust purification catalyst 20, and therefore the oxygen in the inflowing exhaust gas is stored in the upstream side exhaust purification catalyst 20 and NOx is removed by reduction.

Then, if the upstream side exhaust purification catalyst 20 increases in the oxygen storage amount OSA, at the time $t_2$, the oxygen storage amount OSA of the upstream side exhaust purification catalyst 20 reaches the switching reference storage amount Cref. Therefore, the cumulative oxygen excess/deficiency ΣOED reaches the switching reference value OEDref which corresponds to the switching reference storage amount Cref. In the present embodiment, if the cumulative oxygen excess/deficiency ΣOED becomes equal to or greater than the switching reference value OEDref, the storage of oxygen in the upstream side exhaust purification catalyst 20 is suspended by switching the target air-fuel ratio AFT to the rich set air-fuel ratio AFTrich. Further, at this time, the cumulative oxygen excess/deficiency ΣOED is reset to 0.

If the target air-fuel ratio is switched to the rich set air-fuel ratio AFTrich at the time $t_2$, the exhaust gas flowing into the upstream side exhaust purification catalyst 20 contains unburned gas, etc., and therefore the upstream side exhaust purification catalyst 20 gradually decreases in oxygen storage amount OSA. Then, at the time $t_3$, in a similar way to time $t_1$, the output air-fuel ratio AFdwn of the downstream side air-fuel ratio sensor 41 reaches the rich judged air-fuel ratio AFrich. As a result, the target air-fuel ratio AFT is switched to the lean set air-fuel ratio AFTlean. Then, the cycle of the above mentioned times $t_1$ to $t_4$ is repeated. By performing the above mentioned basic control, it is possible to constantly suppress the amount of exhaust of $NO_X$ from the upstream side exhaust purification catalyst 20.

Note that, in the above embodiment, during the times $t_1$ to $t_2$ and during the times $t_2$ to $t_3$, the target air-fuel ratio AFT is maintained at the lean set air-fuel ratio AFTlean and the rich set air-fuel ratio AFTrich, respectively. However, during these time period, the target air-fuel ratio does not necessarily have to be maintained constant.

Further, in the present embodiment, the target air-fuel ratio AFT is set, by the ECU 31. Therefore, the ECU 31 set the target air-fuel ratio of the exhaust gas flowing into the upstream side exhaust purification catalyst 20 to a lean air-fuel ratio, when the air-fuel ratio detected by the downstream side air-fuel ratio sensor 41 becomes equal to or less than the rich judged air-fuel ratio, until the oxygen storage amount OSA of the upstream side exhaust purification catalyst 20 is estimated to have become equal to or greater than the switching reference storage amount Cref. In addition, the ECU 31 set the target air-fuel ratio to a rich air-fuel ratio, when the oxygen storage amount OSA of the upstream side exhaust purification catalyst 20 is estimated to have become equal to or greater than the switching reference storage amount Cref, until the air-fuel ratio detected the downstream side air-fuel ratio sensor 41 becomes equal to or less than a rich judged air-fuel ratio without the oxygen storage amount OSA reaching the maximum storable oxygen amount Cmax.

More simply speaking, in the present embodiment, the ECU 31 can be said to switch the target air-fuel ratio (that is, the air-fuel ratio of the exhaust gas flowing into the upstream side exhaust purification catalyst 20) to the lean air-fuel ratio when the air-fuel ratio detected by the downstream side air-fuel ratio sensor 41 becomes equal to or less than the rich judged air-fuel ratio, and to switch the target air-fuel ratio (that is, the air-fuel ratio of the exhaust gas flowing into the upstream side exhaust purification catalyst 20) to the rich air-fuel ratio when the oxygen storage amount OSA of the upstream side exhaust purification catalyst 20 becomes equal to or greater than the switching reference storage amount Cref.

<<Flow Chart of Control for Setting Target Air-Fuel Ratio>>

Figure 4:
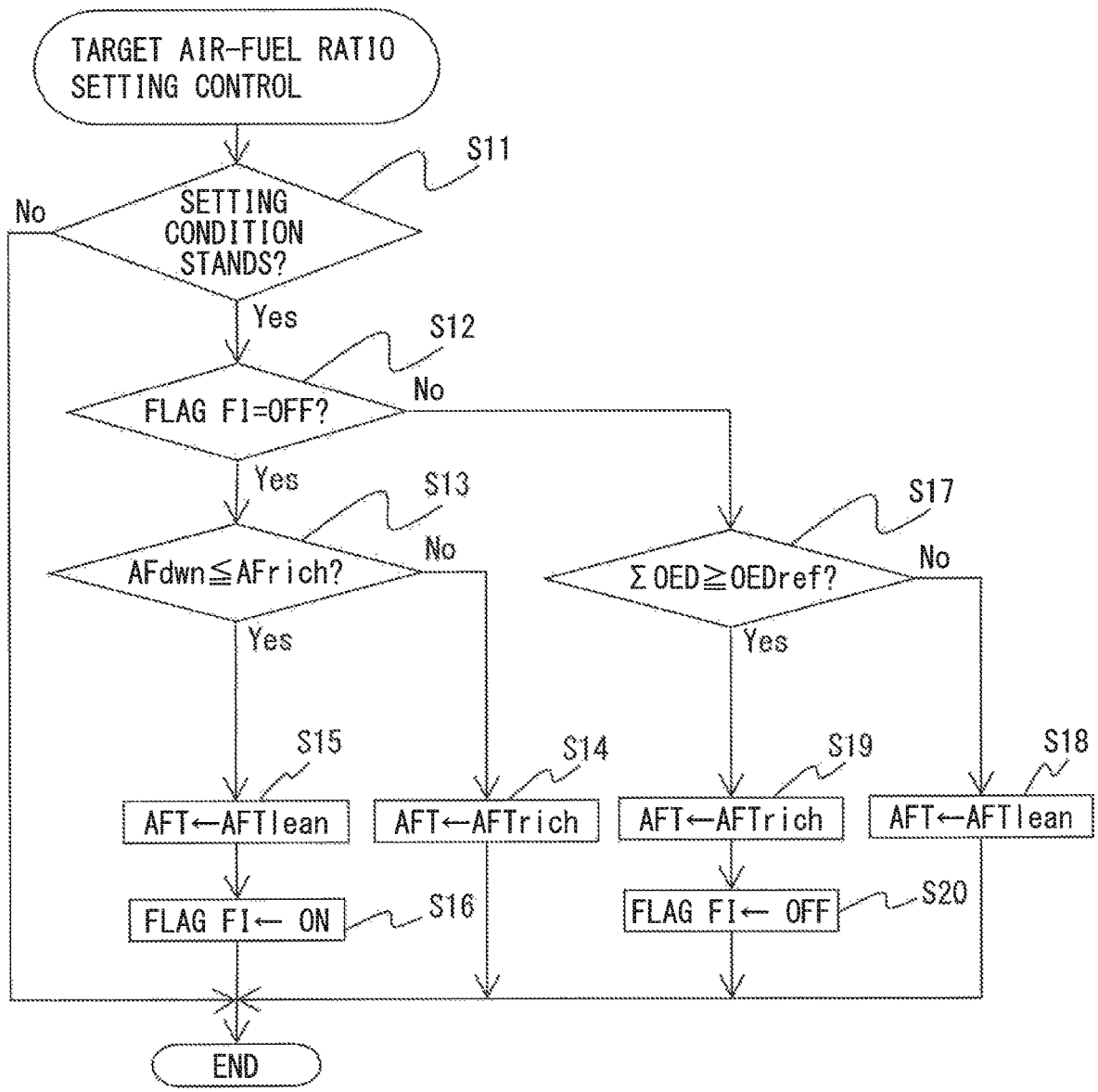
FIG. 4 is a flow chart showing a control routine of control for setting a target air-fuel ratio.

FIG. 4 is a flow chart showing the control routine of control for setting the target air-fuel ratio. The control routine shown in the figure is performed by interruption every certain time interval (for example, 4 msec).

As shown in FIG. 4, first, at step S11, it is judged if the condition for setting the target air-fuel ratio AFT stands. The case where the condition for setting the target air-fuel ratio AFT stands is, for example, in the case where normal operation is performed, in which a feedback control is performed, such as in the case where fuel cut control is not performed. When it is judged at step S11 that the condition for setting the target air-fuel ratio stands, the routine proceeds to step S12.

Next, at step S12, it is judged if the lean set flag Fl is set to OFF. The lean set flag Fl is a flag which is set to ON when the target air-fuel ratio AFT is set to the lean air-fuel ratio, and is set to OFF otherwise. When it is judged at step S12 that the lean set flag Fl is set to OFF, the routine proceeds to step S13. At step S13, it is judged if the output air-fuel ratio AFdwn of the downstream side air-fuel ratio sensor 41 is equal to or less than the rich judged air-fuel ratio AFrich. If it is judged that the output air-fuel ratio AFdwn of the downstream side air-fuel ratio sensor 41 is larger than the rich judged air-fuel ratio AFrich, the routine proceeds to step 14. At step S14, the target air-fuel AFT is maintained to the rich set air-fuel ratio AFTrich, and the control routine is ended.

On the other hand, if the oxygen storage amount OSA of the upstream side exhaust purification catalyst 20 decreases and thus the air-fuel ratio of the exhaust gas flowing out from the upstream side exhaust purification catalyst 20 falls, it is judged that the output air-fuel ratio AFdwn of the downstream side air-fuel ratio sensor 41 is equal to or less than the rich judged air-fuel ratio AFrich at step S13. In this case, the routine proceeds to step S15, and the target air-fuel ratio AFT is switched to the lean set air-fuel ratio AFTlean. Next, at step S16, the lean set flag Fl is set to ON, then the control routine is ended.

If the lean set flag Fl is set to ON, in the next control routine, the routine proceeds from step S12 to step S17. In step S17, it is judged if the cumulative oxygen excess/deficiency ΣOED from the time when the target air-fuel ratio AFT was switched to the lean set air-fuel ratio AFTlean is equal to or greater than the switching reference value OEDref. If it is judged that the cumulative oxygen excess/deficiency ΣOED is lower than the switching reference value OEDref, the routine proceeds to step S18, and the target air-fuel ratio AFT is continuously set to the lean set air-fuel ratio AFTlean and is maintained. Then, the control routine is ended. On the other hand, if the oxygen storage amount of the upstream side exhaust purification catalyst 20 increases, finally, it is judged at step S17 that the cumulative oxygen excess/deficiency ΣOED is equal to or greater than the switching reference value OEDref, and thus the routine proceeds to step S19. At step S19, the target air-fuel ratio AFT is switched to the rich set air-fuel ratio AFTrich. Next, at step S20, the lean set flag Fl is reset to OFF, and then the control routine is ended.

<<EGR Rate and HC Poisoning>>

In this regard, the concentration of unburned HC contained in exhaust gas discharged from the combustion chambers 5 changes in accordance with the EGR rate of the intake gas taken into the combustion chambers 5. This will be explained with reference to FIG. 5.

FIG. 5 is a view showing the relationship between the EGR rate of the intake gas sucked into the combustion chambers 5 and the concentration of unburned HC in the exhaust gas discharged from the combustion chambers 5. As will be understood from FIG. 5, if the EGR rate is equal to or greater than a certain predetermined value REs, the higher the EGR rate and therefore the higher the ratio of the exhaust gas in the intake gas, the higher the concentration of HC in the exhaust gas discharged from the combustion chambers 5 of the engine body 1.

Such a phenomenon arises both when the air-fuel ratio when the air-fuel mixture is burned in the combustion chambers 5 (combustion air-fuel ratio) is a rich air-fuel ratio and when it is a lean air-fuel ratio. Therefore, the above-mentioned phenomenon means that regardless of the combustion air-fuel ratio, the exhaust gas also contains oxygen and unburned HC and that as the EGR rate becomes higher, the concentration of HC and concentration of oxygen in the exhaust gas discharged from the combustion chambers 5 both become higher.

The reason why when the EGR rate is equal to or greater than the predetermined value REs, the higher the EGR rate, the higher the concentration of HC in the exhaust gas becomes in this way, is that the higher the EGR rate, the slower the combustion of the air-fuel mixture in the combustion chambers 5. It is believed that if the combustion of the air-fuel mixture is slower, the amount of unburned HC remaining in the combustion chambers 5 will be greater and, as a result, the concentration of HC in the exhaust gas will be higher.

If in this way the concentration of HC in the exhaust gas discharged from the combustion chambers 5 is higher, that is, if the concentration of HC in the exhaust gas flowing into the exhaust purification catalysts 20 and 24 is higher, the exhaust purification catalysts will be more susceptible to HC poisoning. This will be explained with reference to FIGS. 6A to 6D and 7A to 7D.

FIGS. 6A to 6D and 7A to 7D are views schematically showing the vicinity of the surface of an exhaust purification catalyst. As shown in FIGS. 6A to 6D and 7A to 7D, at the surface of an exhaust purification catalyst, platinum or another precious metal 52 is supported on a support 51 supporting a substance having an oxygen storage ability. Note that, the region shown by 51a in the support 51 of FIGS. 6A to 6D and 7A to 7D shows a region in which no oxygen is stored, the region shown by 51b shows a region in which oxygen is stored, and the region shown by 51c shows a region in which oxygen is partially stored. Further, FIGS. 6A to 6D and 7A to 7D show the state where the air-fuel ratio of the exhaust gas flowing into the exhaust purification catalyst alternately changes between the rich air-fuel ratio and the lean air-fuel ratio.

Figure 6A:
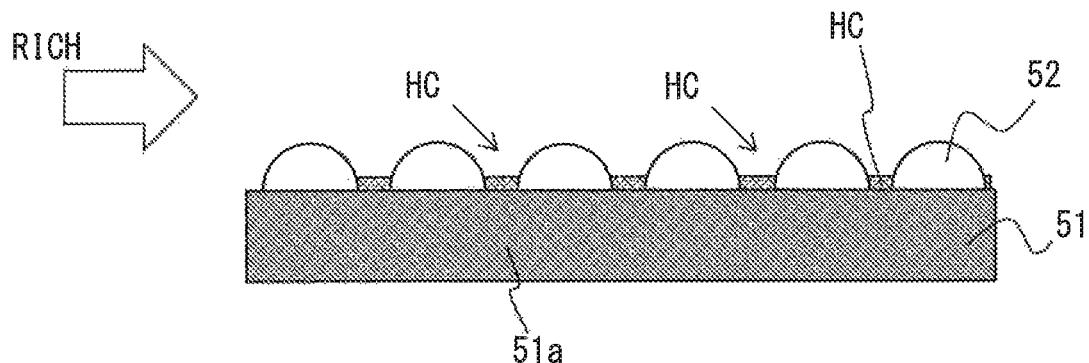
FIGS. 6A to 6D are views schematically showing the vicinity of the surface of an exhaust purification catalyst in the case where the EGR rate is maintained low.

FIGS. 6A to 6D show the state near the surface of the exhaust purification catalyst when the EGR rate is maintained at a medium extent (for example, near the predetermined value REs). As shown in FIG. 6A, if exhaust gas of a rich air-fuel ratio flows into the exhaust purification catalyst, the oxygen storage amount of the exhaust purification catalyst will decrease and finally will become substantially zero (state right before time $t_1$ of FIG. 3). If, in this state, exhaust gas of a rich air-fuel ratio flows in, since the exhaust gas contains unburned HC, HC will deposit on the support 51 and around the precious metal 52. As a result, the precious metal will fall in activity, but the amount of deposition of HC does not become that great, and therefore the drop in activity of the precious metal also does not become that great.

Figure 6B:
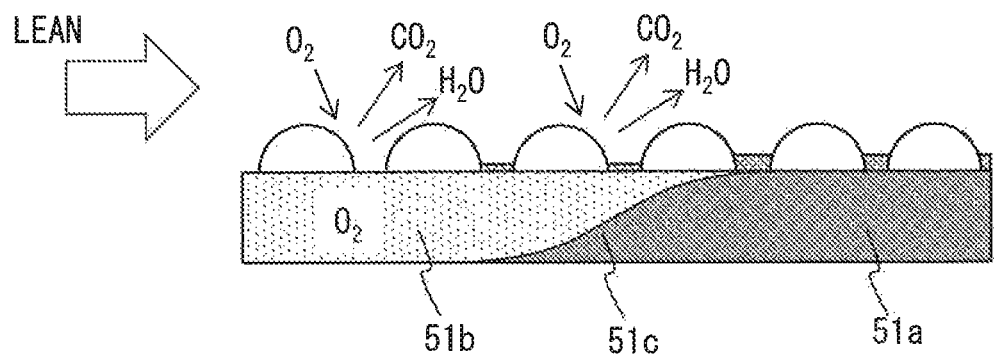

Then, as shown in FIG. 6B, if exhaust gas of a lean air-fuel ratio flows into the exhaust purification catalyst, the exhaust purification catalyst will store the oxygen in order from the upstream side. Further, along with storage of oxygen, the HC which was deposited on the support 51 and around the precious metal 52 is removed by oxidation. However, as explained above, the air-fuel ratio of the exhaust gas flowing into the exhaust purification catalyst is switched from the lean air-fuel ratio to the rich air-fuel ratio before the oxygen storage amount reaches the maximum storable oxygen amount Cmax (time $t_2$ of FIG. 3). Therefore, in the region at the downstream side of the exhaust purification catalyst, the HC which had deposited on the support 51 and around the precious metal 52 remains as it is. As a result, as shown in FIG. 6B, slight HC remains as deposited at the region 51c, while a relatively large amount of HC remains as deposited at the region 51a.

Figure 6C:
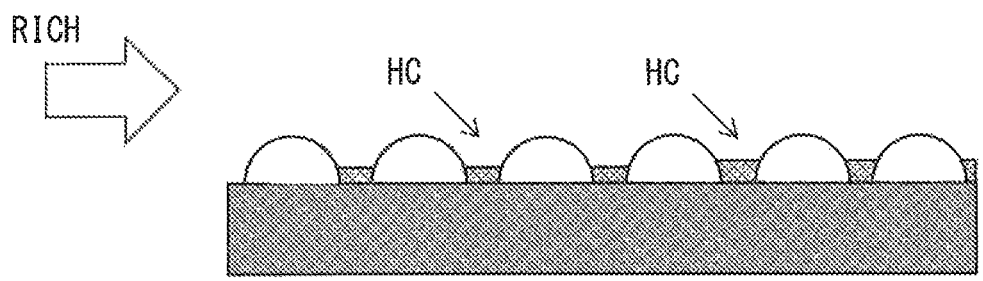
Figure 6D:
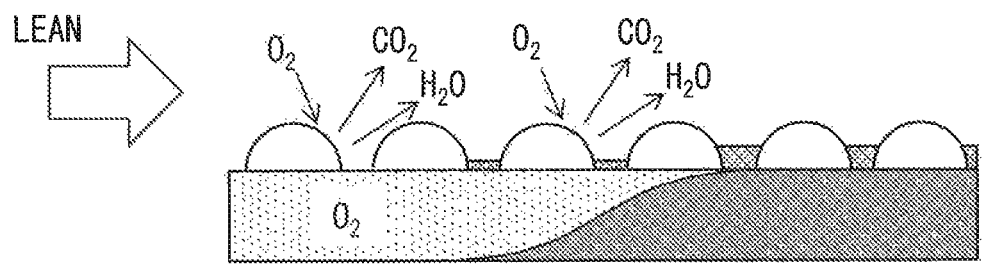

Then, as shown in FIG. 6C, if exhaust gas of a rich air-fuel ratio flows into the exhaust purification catalyst, HC again deposits on the support 51 and around the precious metal 52. Further, as shown in FIG. 6D, if exhaust gas of a lean air-fuel ratio flows into the exhaust purification catalyst, along with storage of oxygen, the HC is removed by oxidation. However, in the same way as the case shown in FIG. 6B, HC remains as is at the downstream side of the exhaust purification catalyst. The total amount of deposition of HC at this time increases over when exhaust gas of a lean air-fuel ratio flew into the exhaust purification catalyst previous time (FIG. 6B). In this way, HC gradually deposits on the surface of the exhaust purification catalyst.

However, FIGS. 6A to 6D show the case where the EGR rate is maintained to a medium extent. Therefore, the concentration of HC in the exhaust gas flowing into the exhaust purification catalyst is not that high. Accordingly, as shown in FIGS. 6A to 6D, the speed by which the unburned HC deposits is not that fast. Further, even if HC remains as deposited at the downstream side part of the exhaust purification catalyst, if considering the fact that deposited HC is removed by oxidation when the injection of fuel from the fuel injectors 11 is temporarily stopped at the time of vehicle deceleration, etc., in fuel cut control, the activity of the precious metal will seldom fall by an extreme.

On the other hand, FIGS. 7A to 7D show the state near the surface of an exhaust purification catalyst when the EGR rate is maintained high. As will be understood from FIGS. 7A to 7D, even when the EGR rate is maintained high, in the same way as when the EGR rate shown in FIGS. 6A to 6D is maintained at a medium extent, HC will repeatedly deposit on and be removed by oxidation from the support 51 or around the precious metal 52 of the exhaust purification catalyst, by the air-fuel ratio of the exhaust gas being alternately switched between the rich air-fuel ratio and the lean air-fuel ratio.

Figure 7A:
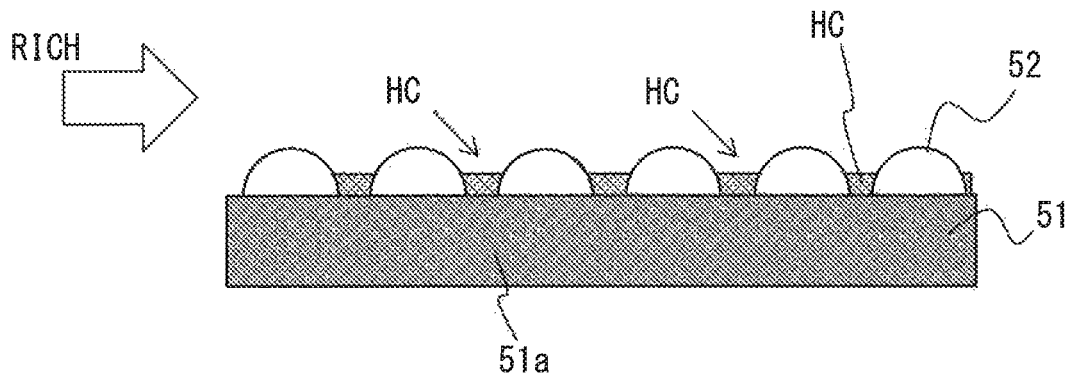
FIGS. 7A to 7D are views schematically showing the vicinity of the surface of an exhaust purification catalyst in the case where the EGR rate is maintained high.
Figure 7B:
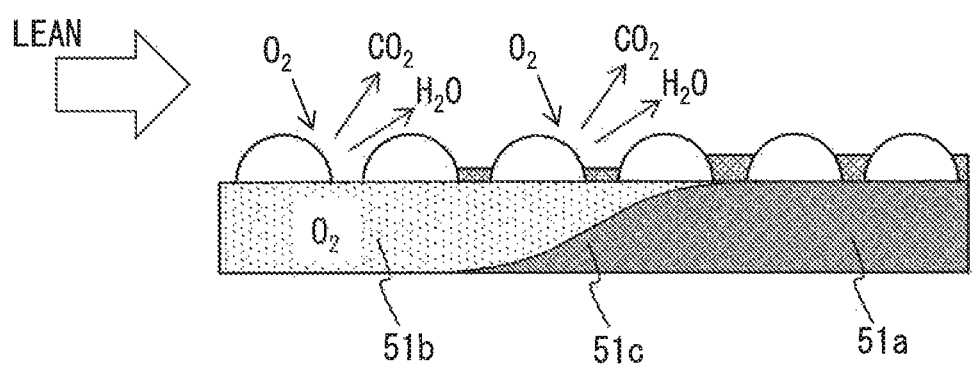
Figure 7C:
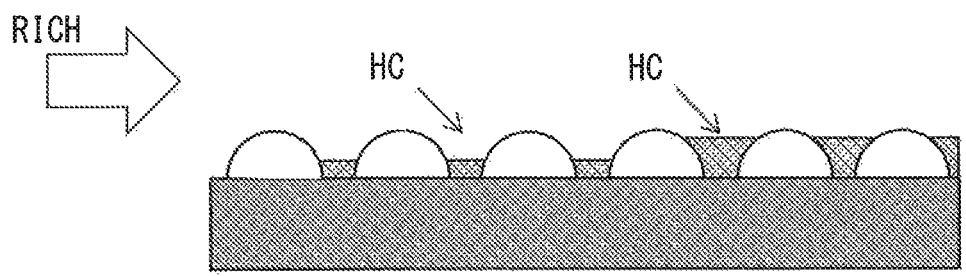
Figure 7D:
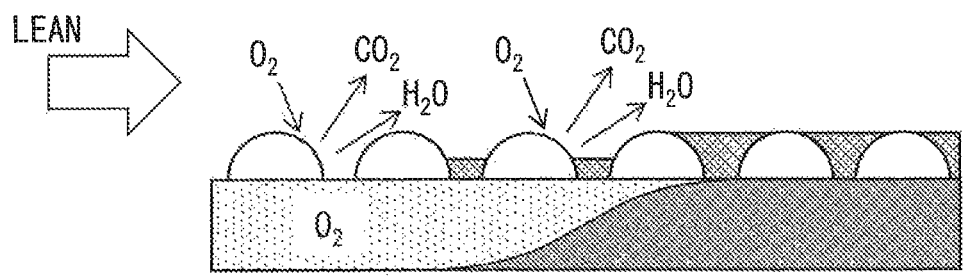

However, if the EGR rate is maintained high, the concentration of HC in the exhaust gas flowing into the exhaust purification catalyst will be high. Therefore, as shown in FIGS. 7A and 7C, when exhaust gas of a rich air-fuel ratio flows into the exhaust purification catalyst, compared to when the EGR rate is maintained at a medium extent, a large amount of HC will deposit on the support 51 and around the precious metal 52. As a result, as shown in FIG. 7D, in the region 51a where even if exhaust gas of a lean air-fuel ratio flows into the exhaust purification catalyst, oxygen will not be stored, a large amount of HC will deposit on the support 51 and around the precious metal 52. In particular in this region, the precious metal 52, etc., will fall in activity. As a result, due to HC poisoning, the purification ability of the exhaust purification catalyst will fall and even if the exhaust purification catalyst stores a certain extent of oxygen, parts of the HC and $NO_X$ in the exhaust gas will not be removed by the exhaust purification catalyst and will flow out as they are.

<<Air-Fuel Ratio Control in First Embodiment>>

Therefore, in the exhaust purification system according to the first embodiment, the switching reference storage amount Cref is increased, when the EGR rate is equal to or greater than a predetermined reference EGR rate, compared to when it is less than the reference EGR rate. In other words, in the present exhaust purification system, the air-fuel ratio of the exhaust gas flowing into the upstream side exhaust purification catalyst 20 is switched from the lean air-fuel ratio to the rich air-fuel ratio, when the oxygen storage amount of the upstream side exhaust purification catalyst 20 is larger, when the EGR rate is equal to or greater than the reference EGR rate, compared to when it is less than the reference EGR rate. Note that, the reference EGR rate is set to a value within a predetermined EGR rate region X where the concentration of HC flowing out from the engine body becomes higher along with an increase in the EGR rate (in the example shown in FIG. 5, EGR rate region equal to or greater than the predetermined value REs. Below, referred to as the "specific EGR rate region").

As a result of such control being performed, in the present exhaust purification system, each duration time, during which the air-fuel ratio of the exhaust gas flowing into the upstream side exhaust purification catalyst 20 is set to the lean set air-fuel ratio, is longer, when the EGR rate is equal to or greater than the reference EGR rate, compared to when it is less than the reference EGR rate. In addition, in the present exhaust purification system, the lean degree of the lean set air-fuel ratio is set larger, when the EGR rate is equal to or greater than the reference EGR rate, compared to when it is less than the reference EGR rate.

Figure 8:
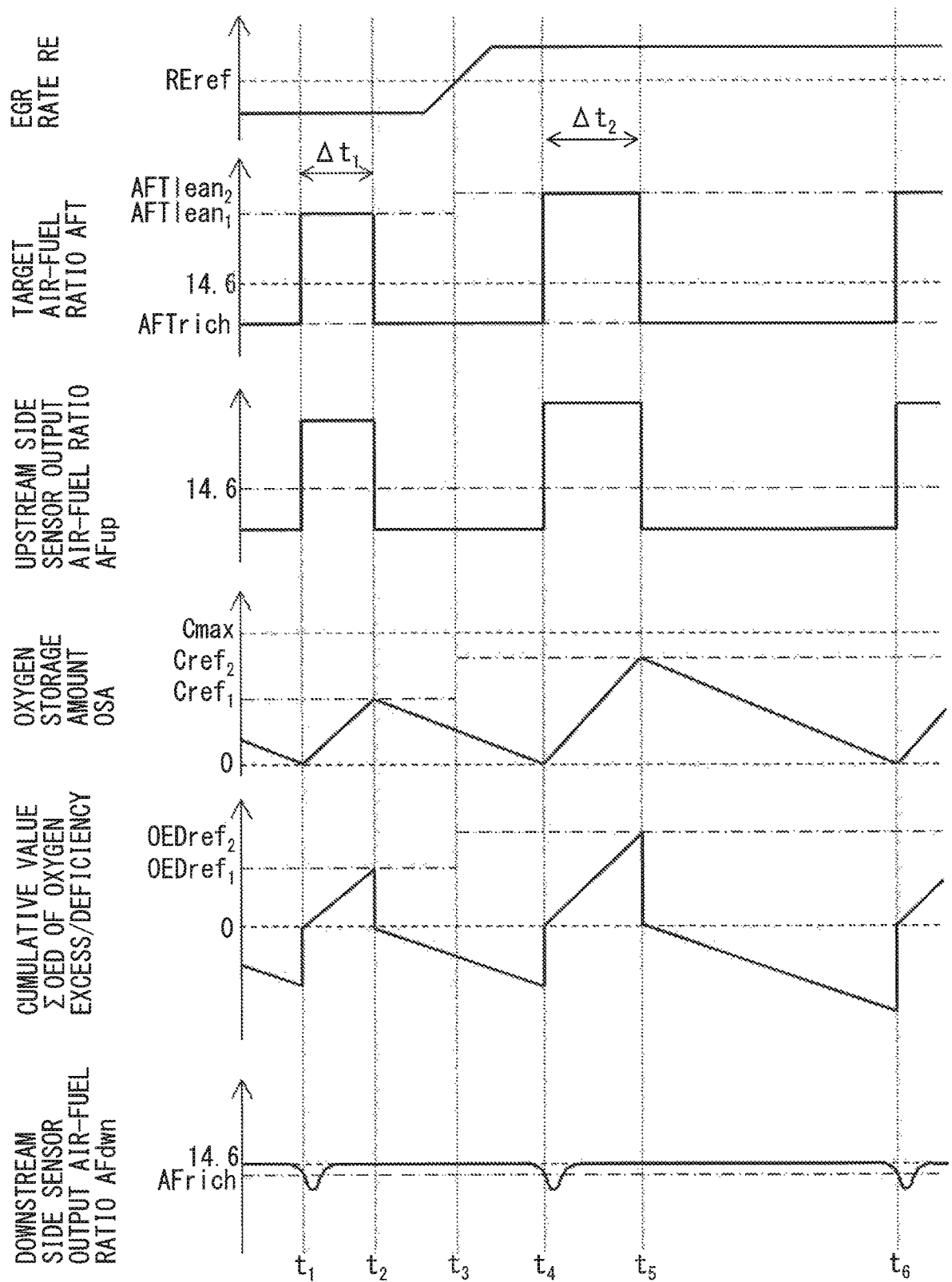
FIG. 8 is a time chart of the EGR rate, etc., when performing air-fuel ratio control according to a first embodiment.

FIG. 8 is a time chart, similar to FIG. 3, of the EGR rate, etc., when performing air-fuel ratio control according to the present embodiment. In the illustrated example, before the time $t_3$, the EGR rate RE is less than the reference EGR rate REref, while after the time $t_3$, the EGR rate RE is equal to or greater than the reference EGR rate REref.

As shown in FIG. 8, before the time $t_3$, the lean set air-fuel ratio AFTlean is set to the relatively low first lean set air-fuel ratio $AFTlean_1$, while the switching reference storage amount Cref is set to the relatively small first switching reference storage amount $Cref_1$. Therefore, if, at the time $t_1$, the output air-fuel ratio of the downstream side air-fuel ratio sensor 41 becomes equal to or less than the rich judged air-fuel ratio AFrich, the target air-fuel ratio AFT is set to the first lean set air-fuel ratio $AFTlean_1$. Then, if the cumulative oxygen excess/deficiency ΣOED becomes equal to or greater than the first switching reference value $OEDref_1$ corresponding to the first switching reference storage amount $Cref_1$, the target air-fuel ratio is switched to the rich set air-fuel ratio AFTrich. At this time, the each duration time, during which the target air-fuel ratio AFT is set to the first lean set air-fuel ratio $AFTlean_1$ (that is, for example, the period from the time $t_1$ to the time $t_2$), is made $\Delta t_1$.

On the other hand, after the time $t_3$, the lean set air-fuel ratio AFTlean is set to a second lean set air-fuel ratio $AFTlean_2$ larger than the first lean set air-fuel ratio $AFTlean_1$ (higher in lean degree), while the switching reference storage amount Cref is set to a second switching reference storage amount Cref$_2$ greater than the first switching reference storage amount Cref$_1$. Therefore, at the time t$_4$, if the output air-fuel ratio of the downstream side air-fuel ratio sensor 41 is equal to or less than rich judged air-fuel ratio AFrich, the target air-fuel ratio AFT is set to the second lean set air-fuel ratio AFTlean$_2$. Then, if the cumulative oxygen excess/deficiency ΣOED becomes equal to or greater than the second switching reference value OEDref$_2$ corresponding to the second switching reference storage amount Cref$_2$, the target air-fuel ratio is switched to the rich set air-fuel ratio AFTrich. At this time, each duration time, during which the target air-fuel ratio AFT is set to the second lean set air-fuel ratio AFTlean$_2$ (that is, for example, the period from the time t$_4$ to the time t$_5$), is made Δt$_2$ longer than Δt$_1$.

According to the present embodiment, in this way, by increasing the switching reference storage amount Cref when the EGR rate is high, the region where oxygen is not stored even if exhaust gas of a lean air-fuel ratio flows into the upstream side exhaust purification catalyst 20 (region 51a of FIG. 7D) can be reduced as much as possible. As a result, the region where HC poisoning occurs can be kept small.

In addition, according to the present embodiment, when the EGR rate is high, the lean degree of the lean set air-fuel ratio is increased. By increasing the lean degree of the lean set air-fuel ratio in this way, the HC which had deposited on the support 51 and around the precious metal 52 can be removed by oxidation as much as possible. In particular, when the EGR rate is high, the concentration of HC in the exhaust gas flowing into the upstream side exhaust purification catalyst 20 is high, and therefore HC easily remains as deposited even on the region 51c in which oxygen is partially stored. However, by increasing the lean degree of the lean set air-fuel ratio AFTlean, it is possible to remove by oxidation the HC deposited on such a region 51c.

Note that, in the above embodiments, the switching reference storage amount Cref and lean set air-fuel ratio AFTlean are switched in two stages, based on whether the EGR rate is equal to or greater than the reference EGR rate. However, these switching reference storage amount Cref and lean set air-fuel ratio AFTlean do not necessarily have to be switched in two stages. They may also be switched in further multiple stages or continuously as shown in FIG. 9.

Figure 9A:
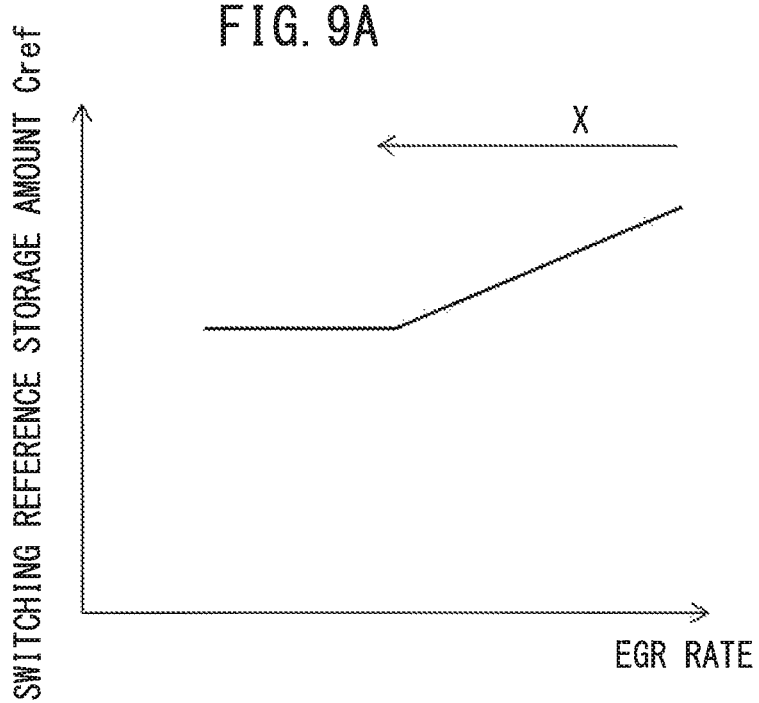
FIGS. 9A and 9B are views showing a relationship of an EGR rate and a switching reference storage amount and lean set air-fuel ratio.
Figure 9B:
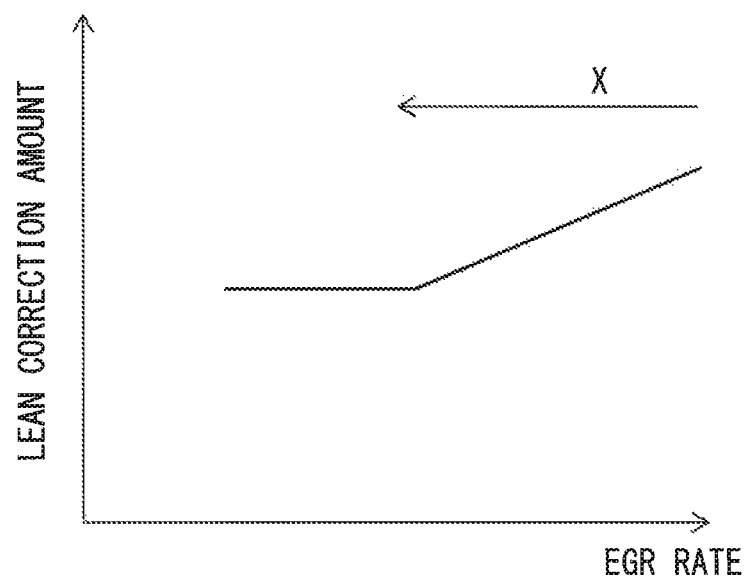

FIG. 9 is a view showing the relationship of the EGR rate and the switching reference storage amount Cref and lean set air-fuel ratio AFTlean. As shown in FIG. 9A, in the case where the switching reference storage amount Cref is continuously switched, in the specific EGR rate region, as the EGR rate is higher, the switching reference storage amount Cref is set greater. Further, as shown in FIG. 9B, in the case where the lean set air-fuel ratio AFTlean is continuously switched, in the specific EGR rate region, as the EGR rate is higher, the lean set air-fuel ratio AFTlean is set larger (lean degree of lean set air-fuel ratio AFTlean is set larger).

Therefore, in the example shown in FIGS. 9A and 9B, the air-fuel ratio of the exhaust gas flowing into the upstream side exhaust purification catalyst 20 is controlled so that the higher the EGR rate is, the greater the oxygen storage amount OSA of the upstream side exhaust purification catalyst 20 for switching the air-fuel ratio of the exhaust gas flowing into the upstream side exhaust purification catalyst 20 from the lean air-fuel ratio to the rich air-fuel ratio. Further, the air-fuel ratio of the exhaust gas flowing into the upstream side exhaust purification catalyst 20 is controlled so that the higher the EGR rate, the larger the lean degree when air-fuel ratio of the exhaust gas flowing into the upstream side exhaust purification catalyst 20 is a lean air-fuel ratio.

Summarizing the above, in the present embodiment, when the EGR rate is in a specific EGR rate region, the air-fuel ratio of the exhaust gas flowing into the upstream side exhaust purification catalyst 20 is controlled so that the air-fuel ratio of the exhaust gas flowing into the upstream side exhaust purification catalyst 20 is switched from the lean air-fuel ratio to the rich air-fuel ratio when the oxygen storage amount OSA of the upstream side exhaust purification catalyst 20 is larger when the EGR rate is relatively high, compared to when it is relatively low. In addition, in the present embodiment, when the EGR rate is in a specific EGR rate region, the air-fuel ratio of the exhaust gas flowing into the upstream side exhaust purification catalyst 20 is controlled so that, when the air-fuel ratio of the exhaust gas flowing into the upstream side exhaust purification catalyst 20 is the lean air-fuel ratio, the lean degree is larger when the EGR rate is relatively high, compared to when it is relatively low. Further, when the EGR rate is in a specific EGR rate region, the air-fuel ratio of the exhaust gas flowing into the upstream side exhaust purification catalyst 20 is controlled so that each duration time, during which the air-fuel ratio of the exhaust gas flowing into the upstream side exhaust purification catalyst 20 is the lean air-fuel ratio, is longer when the EGR rate is relatively high, compared to when it is relatively low.

In the above embodiment, when the EGR rate is high, the duration time, during which the target air-fuel ratio is set to the lean set air-fuel ratio, is set longer, and the lean degree of the lean set air-fuel ratio is set larger. In this regard, from the viewpoint of suppressing HC poisoning, enlarging the lean degree of the lean set air-fuel ratio is effective, but if overly increasing the lean degree, there is the possibility that the NO$_X$ in the exhaust gas will no longer be able to be sufficiently removed by the upstream side exhaust purification catalyst 20. By lengthening the duration time while enlarging the lean degree like in the above embodiment, it is possible to reduce the extent of enlarging the lean degree, and accordingly reliably remove the NO$_X$ in the exhaust gas while suppressing HC poisoning.

However, when the EGR rate is high, as long as the switching reference storage amount is finally larger, it is not necessarily required that both of these be changed. Therefore, for example, it is possible to not enlarge the lean degree of the lean set air-fuel ratio, but lengthen its duration time. Alternatively, the duration time may not be lengthened, but the lean degree of the lean set air-fuel ratio may be enlarged.

<<Explanation of Flow Chart>>

Figure 10:
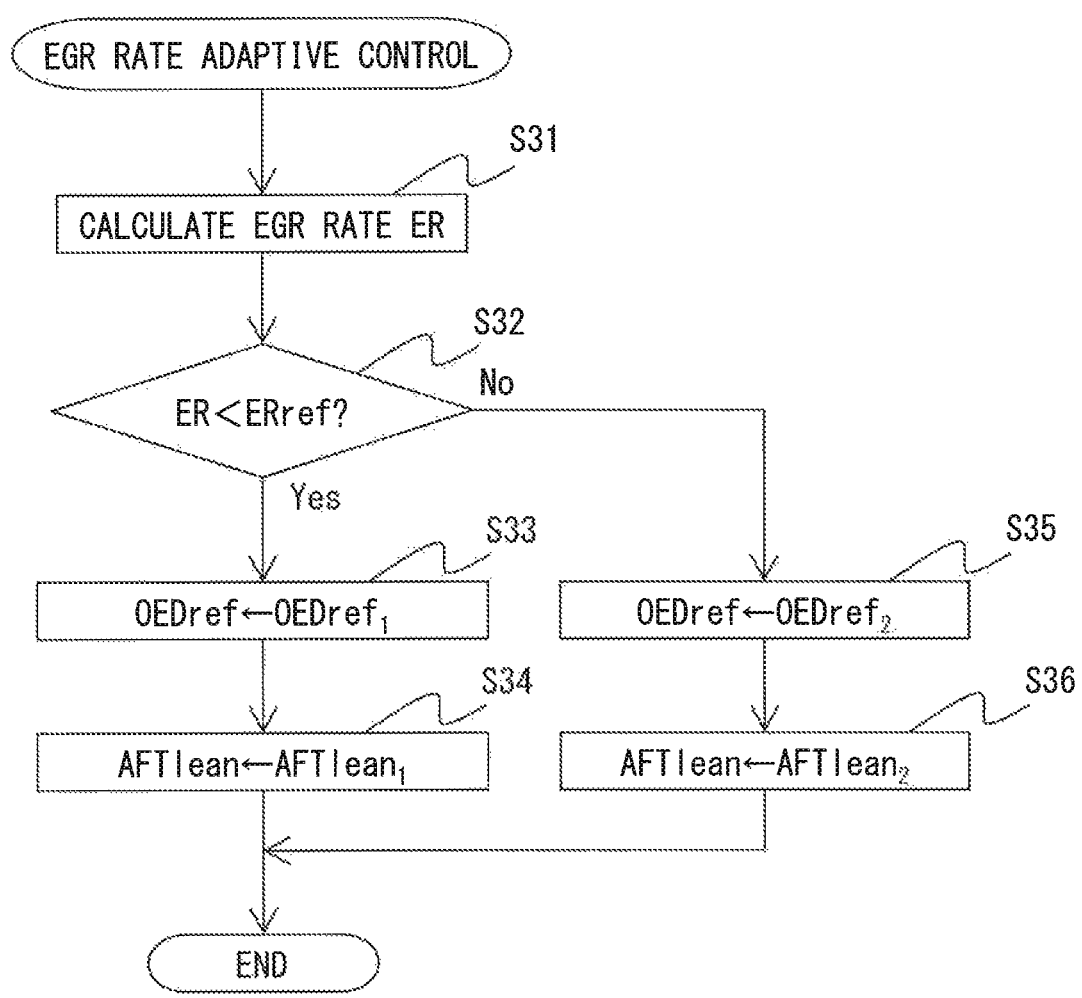
FIG. 10 is a flow chart showing a control routine of EGR rate adaptive control for setting a switching reference storage amount and lean set air-fuel ratio in accordance with the EGR rate.

FIG. 10 is a flow chart showing a control routine of EGR rate adaptive control for setting a switching reference storage amount Cref and lean set air-fuel ratio AFTlean according to the EGR rate. The illustrated control routine is performed at constant time intervals.

First, at step S31, the EGR rate RE is calculated. The EGR rate RE may be calculated by various methods. The EGR rate is, for example, calculated based on the output of the air flow meter 39, the opening degree of the EGR control valve 26, and the opening degree of the throttle valve 18, etc.

Next, at step S32, it is judged if the EGR rate RE calculated at step S31 is less than the reference EGR rate REref. If it is judged that the EGR rate RE is less than the reference EGR rate REref, the routine proceeds to step S33. At step S33, the cumulative oxygen excess/deficiency ΣOED is set to the first switching reference value OEDref$_1$ corresponding to the first switching reference storage amount $Cref_1$. Next, at step S34, the lean set air-fuel ratio AFTlean is set to the first lean set air-fuel ratio $AFTlean_1$ and the control routine is ended.

On the other hand, if at step S32 it is judged that the EGR rate RE is equal to or greater than the reference EGR rate REref, the routine proceeds to step S35. At step S35, the cumulative oxygen excess/deficiency ΣOED is set to a second switching reference value $OEDref_2$(>$OEDref_1$) corresponding to the second switching reference storage amount $Cref_2$. Next, at step S36, the lean set air-fuel ratio AFTlean is set to the second lean set air-fuel ratio $AFTlean_2$ (>$AFTlean_1$) and the control routine is ended.

The cumulative oxygen excess/deficiency ΣOED set at step S33 and step S35 is used at step S17 of FIG. 4. Further, the lean set air-fuel ratio AFTlean set at steps S34 and S36 is used at steps S15 and S18 of FIG. 4.

Second Embodiment

Next, referring to FIGS. 11 to 14, an exhaust purification system according to a second embodiment will be explained. The configuration and control of the exhaust purification system according to the second embodiment basically are the same as the configuration and control of the exhaust purification system according to the first embodiment. Therefore, below, the parts different from the exhaust purification system according to the first embodiment will be focused on in the explanation.

<<Basic Control>>

First, the basic air-fuel ratio control in the exhaust purification system according to the second embodiment will be explained in brief. In the air-fuel ratio control according to the first embodiment, when the output air-fuel ratio of the downstream side air-fuel ratio sensor 41 became the rich air-fuel ratio, the target air-fuel ratio was switched from the rich set air-fuel ratio to the lean set air-fuel ratio. As opposed to this, in the present embodiment, when the oxygen storage amount OSA of the upstream side exhaust purification catalyst 20 becomes equal to or less than the lower limit storage amount Clref, which is greater than zero, the target air-fuel ratio is switched from the rich set air-fuel ratio to the lean set air-fuel ratio, while when the oxygen storage amount OSA becomes equal to or greater than the upper limit storage amount Curef, which is smaller than the maximum storable oxygen amount Cmax, the target air-fuel ratio is switched from the lean set air-fuel ratio to the rich set air-fuel ratio. Note that, the oxygen storage amount OSA is calculated, as explained above, by continuously cumulatively adding the calculated oxygen excess/deficiency without reset.

Figure 11:
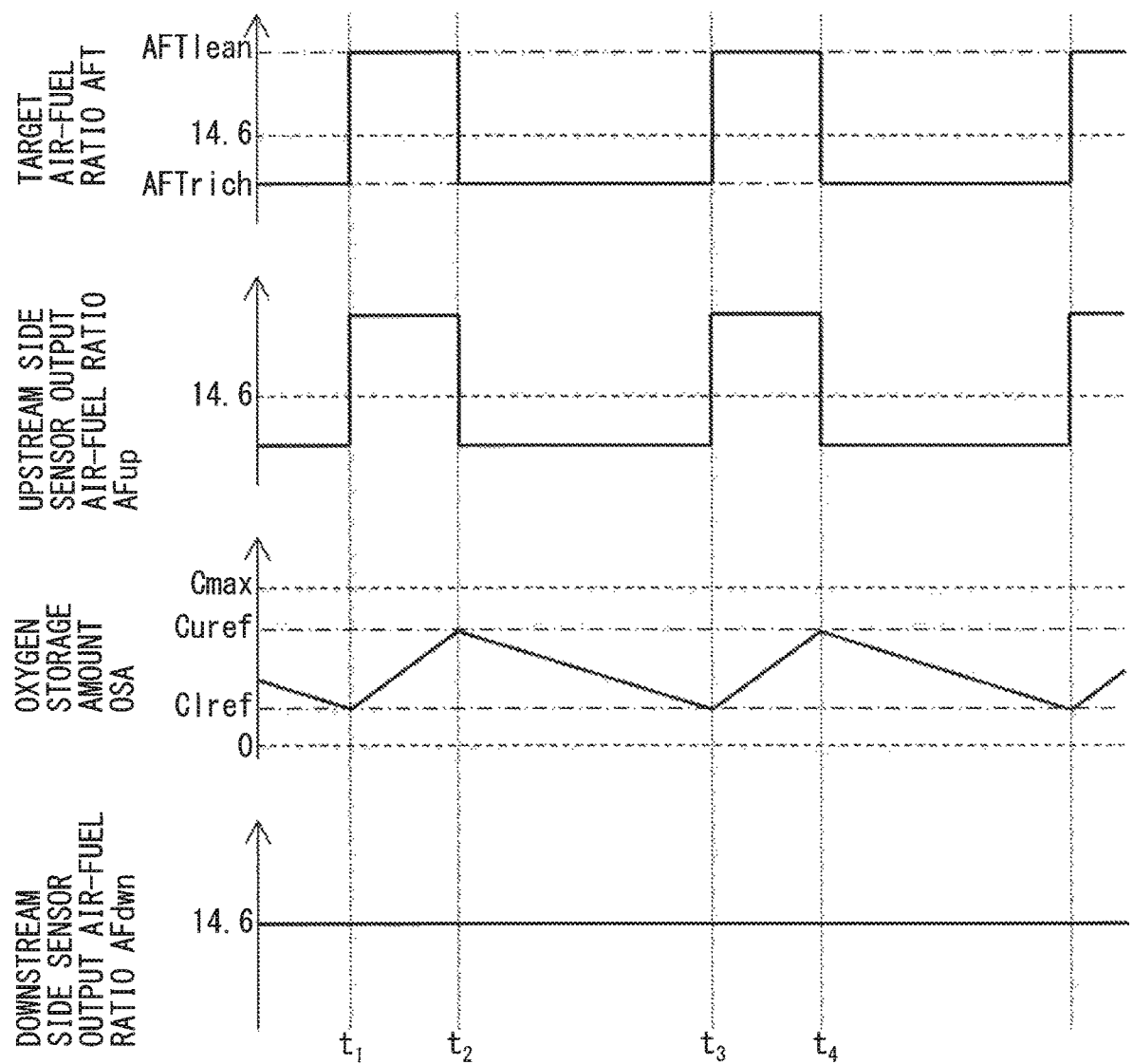
FIG. 11 is a time chart of the target air-fuel ratio, etc., when performing basic air-fuel ratio control according to a second embodiment.

Referring to FIG. 11, the above-mentioned operation will be specifically explained. FIG. 11 is a time chart of the target air-fuel ratio AFT, etc., when performing the basic air-fuel ratio control of the present embodiment. In the illustrated example, in the state before the time $t_1$, the target air-fuel ratio AFT is set to the rich set air-fuel ratio AFTrich. As a result, the oxygen storage amount OSA of the upstream side exhaust purification catalyst 20 gradually decreases. Finally, at the time $t_1$, it reaches the lower limit storage amount Clref.

In the present embodiment, if the oxygen storage amount OSA reaches the lower limit storage amount Clref, the target air-fuel ratio AFT is switched to the lean set air-fuel ratio AFTlean in order to increase the oxygen storage amount OSA. As a result, before the oxygen storage amount OSA approaches zero and part of the unburned HC, etc., starts to flow out from the upstream side exhaust purification catalyst 20, the target air-fuel ratio is switched to the lean air-fuel ratio. Therefore, unburned HC, etc., are kept from flowing out from the upstream side exhaust purification catalyst 20.

If at the time $t_1$ the target air-fuel ratio is switched to the lean air-fuel ratio, the oxygen storage amount OSA of the upstream side exhaust purification catalyst 20 gradually increases. Finally, at the time $t_2$, it reaches the upper limit storage amount Curef (corresponding to switching reference storage amount Cref of first embodiment). In the present embodiment, if the oxygen storage amount OSA reaches the upper limit storage amount Curef, the target air-fuel ratio AFT is switched to the rich set air-fuel ratio in order to decrease the oxygen storage amount. As a result, the target air-fuel ratio is switched to the rich air-fuel ratio, before the oxygen storage amount OSA approaches the maximum storable oxygen amount and parts of the $NO_X$, etc., start to flow out from the upstream side exhaust purification catalyst 20. Therefore, $NO_X$, etc., are kept from flowing out from the upstream side exhaust purification catalyst 20. If switching the target air-fuel ratio AFT to the rich set air-fuel ratio AFTrich, then, at $t_3$, in the same way as $t_1$, the oxygen storage amount OSA reaches the lower limit storage amount Clref, and thus the target air-fuel ratio AFT is switched to the lean set air-fuel ratio AFTlean. Then, the above-mentioned cycle of $t_1$ to $t_3$ is repeated.

Figure 12:
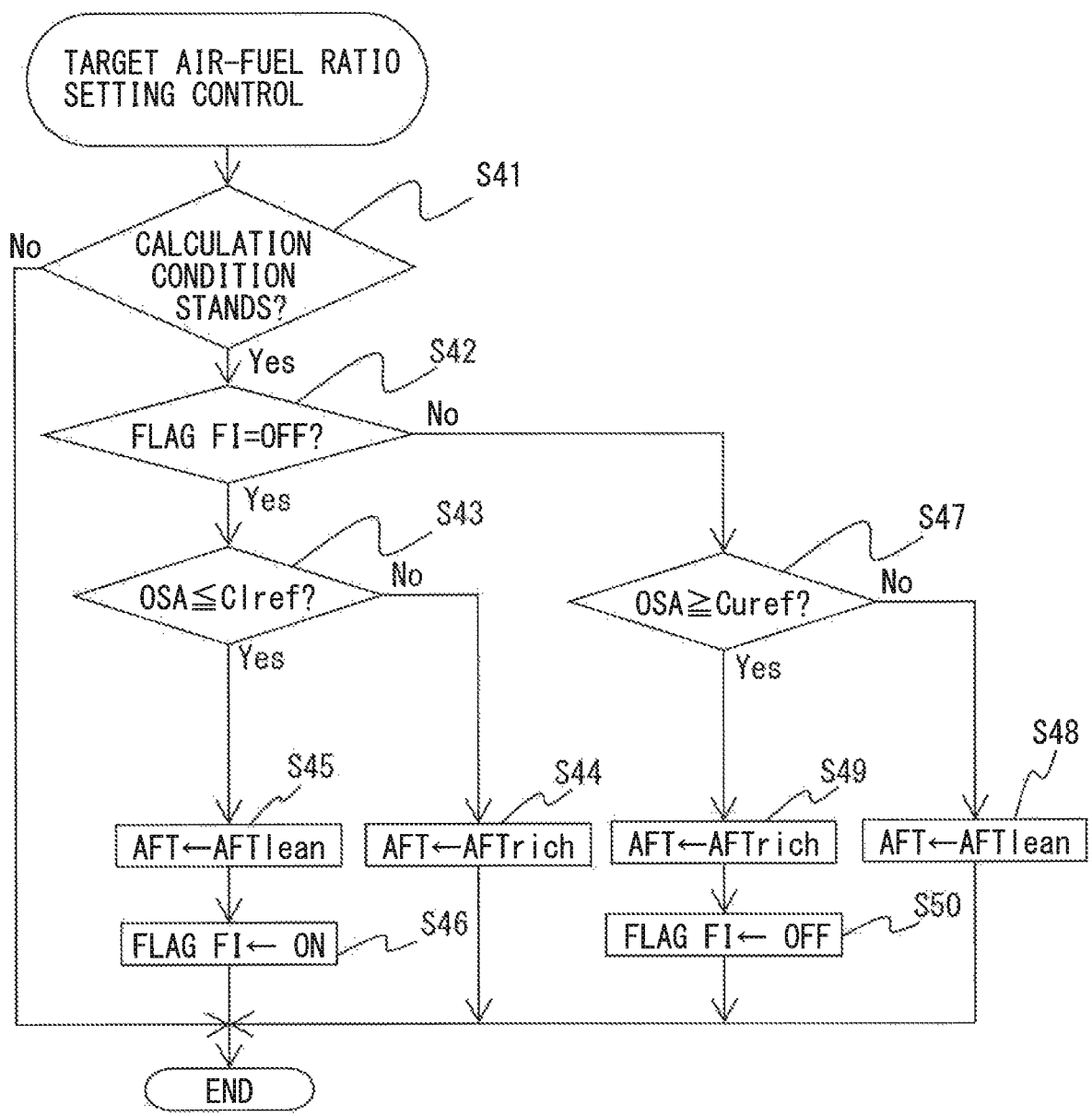
FIG. 12 is a flow chart showing a control routine of control for setting a target air-fuel ratio.

FIG. 12 is a flow chart showing a control routine of control for setting a target air-fuel ratio. The illustrated control routine is performed at constant time intervals (for example, several msec). Steps S41, S42, S44 to S46, and S48 to S50 of FIG. 12 are respectively similar to steps S11, S12, S14 to S16, and S18 to S20 of FIG. 4, and therefore the explanations will be omitted.

At step S43, the current oxygen storage amount OSA is estimated by a technique similar to the method of calculation of the cumulative oxygen excess/deficiency, and it is judged if the estimated oxygen storage amount OSA is equal to or less than the lower limit storage amount Clref. If it is judged that the oxygen storage amount OSA is greater than the lower limit storage amount Clref, the routine proceeds to step S44. On the other hand, if at step S43 it is judged that the oxygen storage amount OSA is equal to or less than the lower limit storage amount Clref, the routine proceeds to step S45.

Further, at step S47, it is judged if the estimated oxygen storage amount OSA is equal to or greater than the upper limit storage amount Curef. If it is judged that the oxygen storage amount OSA is less than the upper limit storage amount Curef, the routine proceeds to step S48. On the other hand, if at step S47 it is judged that the oxygen storage amount OSA is equal to or greater than the upper limit storage amount Curef, the routine proceeds to step S49.

<<Air-Fuel Ratio Control in Second Embodiment>>

In the exhaust purification system according to the second embodiment as well, the switching reference storage amount Cref is increased when the EGR rate is equal to or greater than a predetermined reference EGR rate, compared to when it is less than the reference EGR rate. As a result, in the present exhaust purification system, the duration time, during which the air-fuel ratio of the exhaust gas flowing into the upstream side exhaust purification catalyst 20 is set to the lean set air-fuel ratio, is longer when the EGR rate is equal to or greater than the reference EGR rate in a specific EGR rate region, compared to when it is less than the reference EGR rate. In addition, in the present exhaust purification system as well, the lean degree of the lean set air-fuel ratio is set larger when the EGR rate is equal to or greater than the reference EGR rate, compared to when it is less than the reference EGR rate.

Figure 13:
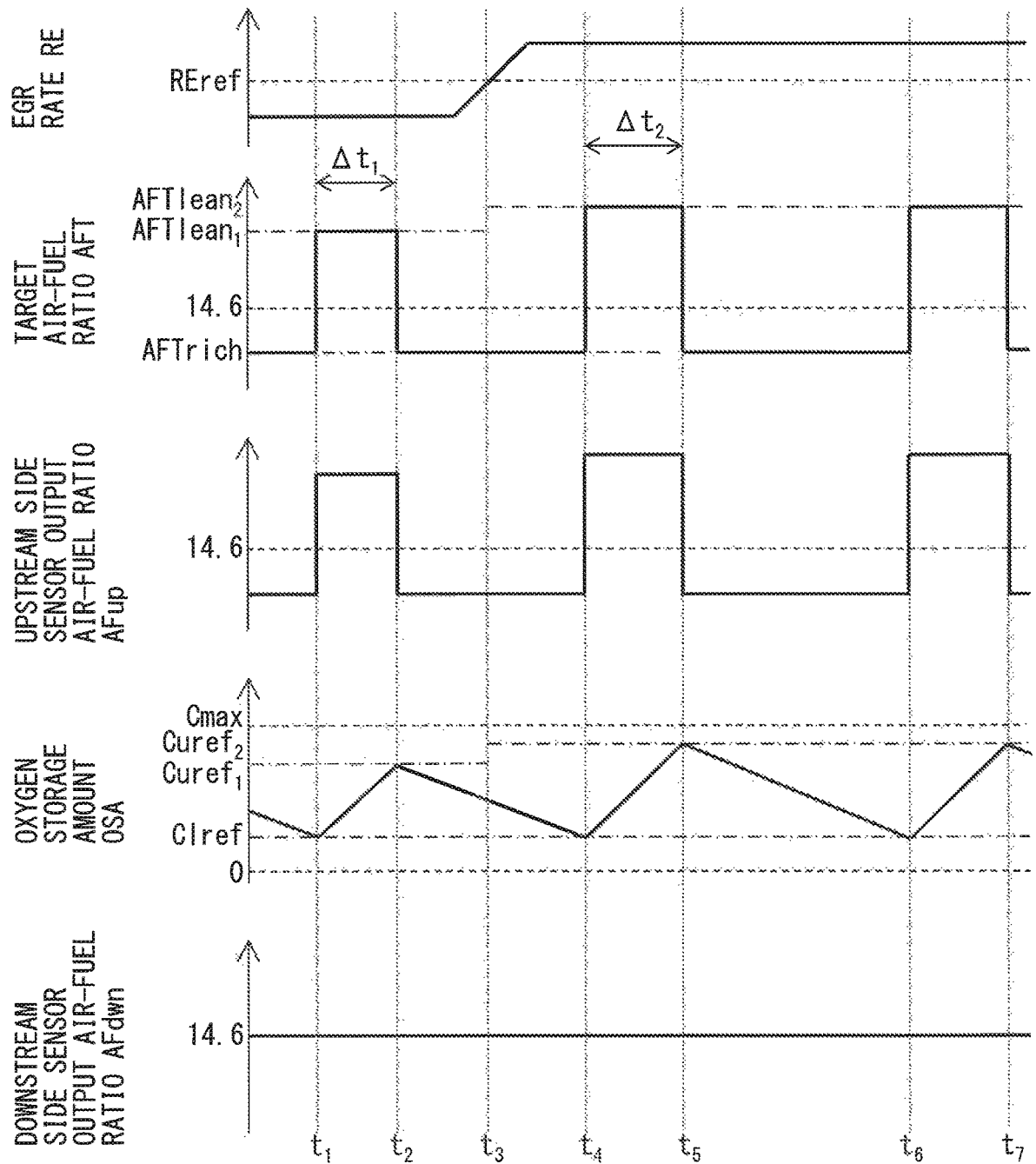
FIG. 13 is a time chart, similar to FIG. 11, of the EGR rate, etc., when performing air-fuel ratio control according to the second embodiment.

FIG. 13 is a time chart, similar to FIG. 11, of the EGR rate, etc., when performing the air-fuel ratio control according to the present embodiment. In the illustrated example, before the time $t_3$, the EGR rate RE is less than the reference EGR rate REref, while after the time $t_3$, the EGR rate RE is equal to or greater than the reference EGR rate REref.

As shown in FIG. 13, before the time $t_3$, the lean set air-fuel ratio AFTlean is set to the relatively low first lean set air-fuel ratio AFTlean$_1$, while the upper limit storage amount Curef is set to the relatively small first upper limit storage amount Curef$_1$. Therefore, if at the time $t_1$ the oxygen storage amount OSA of the upstream side exhaust purification catalyst 20 becomes equal to or less than the lower limit storage amount Clref, the target air-fuel ratio AFT is set to the first lean set air-fuel ratio AFTlean$_1$. Then, if the oxygen storage amount OSA becomes equal to or greater than the first upper limit storage amount Curef$_1$, the target air-fuel ratio AFT is switched to the rich set air-fuel ratio AFTrich. At this time, each duration time during which the target air-fuel ratio AFT is set to the first lean set air-fuel ratio AFTlean$_1$ (that is, for example, the period from the time $t_1$ to the time $t_2$), is made $\Delta t_1$.

On the other hand, after the time $t_3$, the lean set air-fuel ratio AFTlean is set to a second lean set air-fuel ratio AFTlean$_2$ larger than the first lean set air-fuel ratio AFTlean$_1$, while the upper limit storage amount Curef is set to a second upper limit storage amount Curef$_2$ larger than the first upper limit storage amount Curef$_1$. Therefore, if the oxygen storage amount OSA becomes equal to or less than the lower limit storage amount Clref at the time $t_4$, the target air-fuel ratio AFT is set to the second lean set air-fuel ratio AFTlean$_2$. Then, if the oxygen storage amount OSA of the upstream side exhaust purification catalyst 20 becomes equal to or greater than the second upper limit storage amount Curef$_2$, the target air-fuel ratio AFT is switched to the rich set air-fuel ratio AFTrich. At this time, each duration time, during which the target air-fuel ratio AFT is set to the second lean set air-fuel ratio AFTlean$_2$ (that is, for example, the period from the time $t_4$ to the time $t_5$), is made $\Delta t_2$ longer than $\Delta t_1$.

In the present embodiment as well, by making the upper limit storage amount Curef increase when the EGR rate is high, it is possible to keep the region in which HC poisoning occurs small. Further, by increasing the lean degree of the lean set air-fuel ratio when the EGR rate is high, it is possible to remove by oxidation as much of the HC deposited on the support 51 or around the precious metal 52 as possible.

Note that, in the present embodiment as well, the upper limit storage amount Curef and lean set air-fuel ratio AFTlean may be switched to multiple stages or continuously. Further, in the present embodiment as well, if the upper limit storage amount is greater when the EGR rate is high, it is also possible to change only one of each duration time and lean set air-fuel ratio when the target air-fuel ratio is set to the lean set air-fuel ratio.

Figure 14:
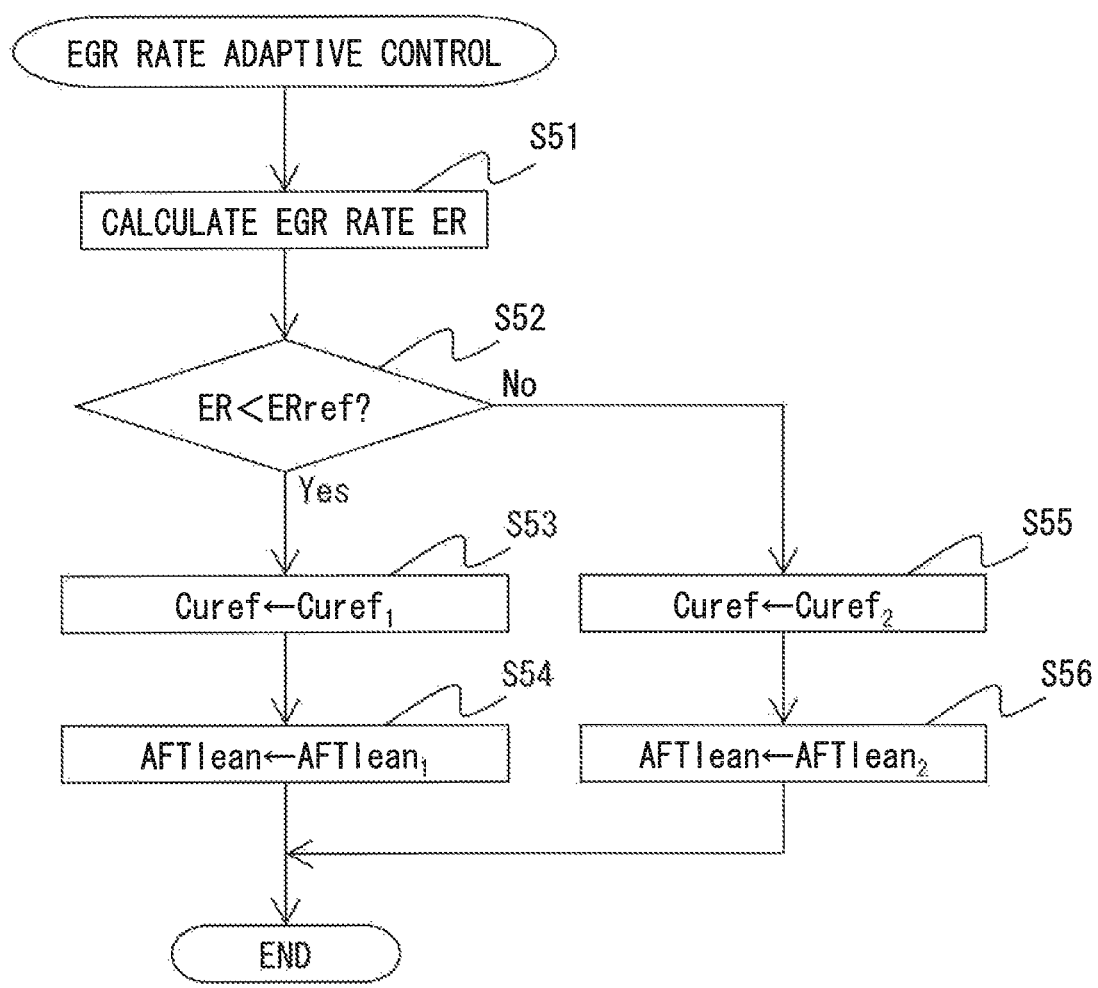
FIG. 14 is a flow chart showing a control routine of EGR rate adaptive control for setting an upper limit storage amount and lean set air-fuel ratio in accordance with the EGR rate.

FIG. 14 is a flow chart showing a control routine of EGR rate adaptive control for setting the upper limit storage amount Curef and lean set air-fuel ratio AFTlean according to the EGR rate. The illustrated control routine is performed at constant time intervals. Steps S51, S52, S54, and S56 of FIG. 14 are respectively similar to steps S31, S32, S34, and S36 of FIG. 10, therefore explanations will be omitted.

In the control routine shown in FIG. 14, step S53 is performed instead of step S33 of FIG. 10, while step S55 is performed instead of step S35 of FIG. 10. At step S53, the upper limit storage amount Curef is set to the first upper limit storage amount Curef$_1$. Further, at step S55, the upper limit storage amount Curef is set to the second upper limit storage amount Curef$_2$(>Curef$_1$).

Third Embodiment

Next, referring to FIGS. 15 and 16, an exhaust purification system according to a third embodiment will be explained. The configuration and control of the exhaust purification system according to the third embodiment basically are the same as the configuration and control of exhaust purification systems according to the first and second embodiments. Therefore, below, the parts different from the exhaust purification systems according to the first and second embodiments will be focused on in the explanation.

<<Basic Control>>

First, the basic air-fuel ratio control in the exhaust purification system according to the third embodiment will be explained in brief. In the air-fuel ratio control according to the first embodiment, when the cumulative oxygen excess/deficiency $\Sigma$OED reaches the switching reference amount OEDref, the target air-fuel ratio was switched from the lean set air-fuel ratio to the rich set air-fuel ratio. As opposed to this, in the present embodiment, when the output air-fuel ratio of the downstream side air-fuel ratio sensor 41 becomes a lean air-fuel ratio, the target air-fuel ratio is switched from the lean set air-fuel ratio to the rich set air-fuel ratio, while when the output air-fuel ratio of the downstream side air-fuel ratio sensor 41 becomes a rich air-fuel ratio, the target air-fuel ratio is switched from the rich set air-fuel ratio to the lean set air-fuel ratio. In the present embodiment, when the output air-fuel ratio of the downstream side air-fuel ratio sensor 41 becomes equal to or greater than a lean judged air-fuel ratio slightly leaner than the stoichiometric air-fuel ratio (for example, 14.65), it is judged that the output air-fuel ratio of the downstream side air-fuel ratio sensor 41 has become a lean air-fuel ratio.

Figure 15:
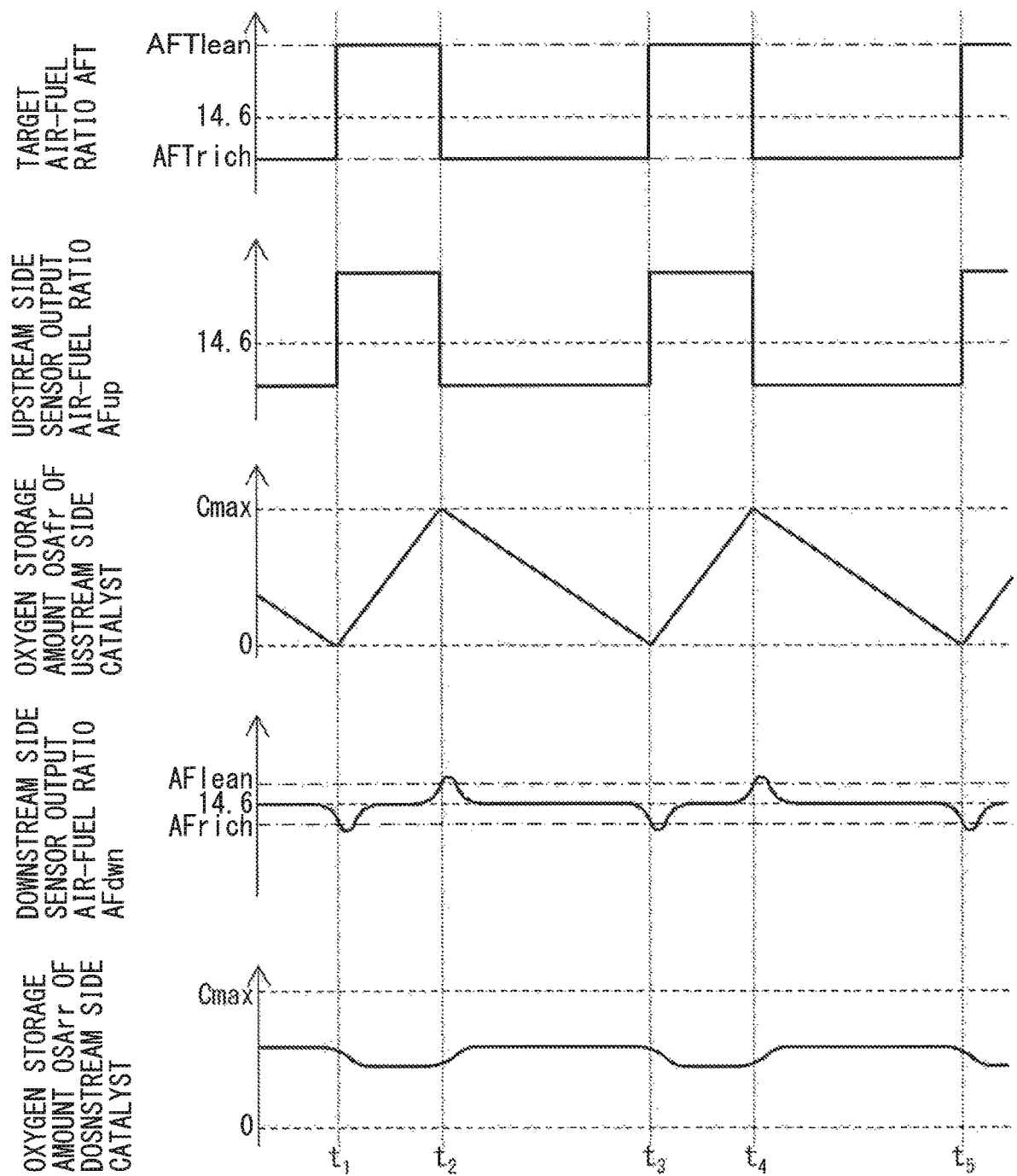
FIG. 15 is a time chart of the target air-fuel ratio, etc., when performing basic air-fuel ratio control according to a third embodiment.

Referring to FIG. 15, the above-mentioned operation will be explained in detail. FIG. 15 is a time chart of the target air-fuel ratio AFT, etc., when performing the basic air-fuel ratio control of the present embodiment. In the illustrated example, in the state before the time $t_1$, the target air-fuel ratio AFT is set to the rich set air-fuel ratio AFTrich. As a result, the oxygen storage amount OSAfr of the upstream side exhaust purification catalyst 20 gradually decreases. Finally, at the time $t_1$, the output air-fuel ratio AFdwn of the downstream side air-fuel ratio sensor 41 reaches the rich judged air-fuel ratio AFrich.

In the present embodiment, if the output air-fuel ratio AFdwn of the downstream side air-fuel ratio sensor 41 reaches the rich judged air-fuel ratio AFrich, the target air-fuel ratio AFT is switched to the lean set air-fuel ratio AFTlean in order to increase the oxygen storage amount OSAfr. At this time, exhaust gas of a rich air-fuel ratio temporarily flows out from the upstream side exhaust purification catalyst 20. This exhaust gas of a rich air-fuel ratio flows into the downstream side exhaust purification catalyst 24. As a result, near the time $t_1$, the oxygen storage amount OSArr of the downstream side exhaust purification catalyst 24 is decreased.

If, at the time $t_1$, the target air-fuel ratio AFT is switched to the lean set air-fuel ratio AFTlean, after the time $t_1$, the oxygen storage amount OSAfr of the upstream side exhaust purification catalyst 20 gradually increases. Finally, at the time $t_2$, the output air-fuel ratio AFdwn of the downstream side air-fuel ratio sensor 41 reaches the lean judged air-fuel ratio AFlean.

In the present embodiment, if the output air-fuel ratio AFdwn of the downstream side air-fuel ratio sensor 41 reaches the lean judged air-fuel ratio AFlean, the target air-fuel ratio AFT is switched to the rich set air-fuel ratio AFTrrich in order to increase the oxygen storage amount OSAfr. At this time, exhaust gas of a lean air-fuel ratio temporarily flows out from the upstream side exhaust purification catalyst 20. This exhaust gas of a lean air-fuel ratio flows into the downstream side exhaust purification catalyst 24. As a result, near the time $t_2$, the oxygen storage amount OSArr of the downstream side exhaust purification catalyst 24 is increased. Then, the cycle of the above-mentioned $t_1$ to $t_3$ is repeated.

<<Air-Fuel Ratio Control in Third Embodiment>>

When performing the control such as shown in FIG. 15, the oxygen storage amount OSAfr of the upstream side exhaust purification catalyst 20 periodically reaches the maximum storable oxygen amount Cmax. Therefore, in the upstream side exhaust purification catalyst 20, even if HC temporarily deposits on the support 51 and precious metal 52, the HC deposited when the oxygen storage amount OSAfr reaches the maximum storable oxygen amount Cmax is basically removed by oxidation. Therefore, in the upstream side exhaust purification catalyst 20, HC poisoning is hard to occur.

On the other hand, if the EGR rate is high and the concentration of HC in the exhaust gas discharged from the combustion chambers 5 is high, the HC is not necessarily completely removed in the upstream side exhaust purification catalyst 20. Part of the HC flows into the downstream side exhaust purification catalyst 24. Therefore, if maintaining the oxygen storage amount OSArr of the downstream side exhaust purification catalyst 24 constant at a medium extent, part of the downstream side exhaust purification catalyst 24 may suffer from HC poisoning.

Therefore, in the exhaust purification system of the third embodiment, when the EGR rate is equal to or greater than the predetermined reference EGR rate in the specific EGR rate region, compared to when it is less than the reference EGR rate, the target air-fuel ratio is controlled so that the air-fuel ratio of the exhaust gas flowing into the downstream side exhaust purification catalyst 24 changes between the rich air-fuel ratio and the lean air-fuel ratio in a state where the oxygen storage amount OSArr of the downstream side exhaust purification catalyst 24 is large on average. Therefore, in the exhaust purification system of the third embodiment, when the EGR rate is equal to or greater than the above predetermined reference EGR rate, compared to when it is less than the reference EGR rate, the air-fuel ratio of the exhaust gas flowing into the downstream side exhaust purification catalyst 24 is controlled so that the air-fuel ratio of the exhaust gas flowing into the downstream side exhaust purification catalyst 24 is switched from the lean air-fuel ratio to the rich air-fuel ratio when the oxygen storage amount OSArr of the downstream side exhaust purification catalyst 24 is large.

Figure 16:
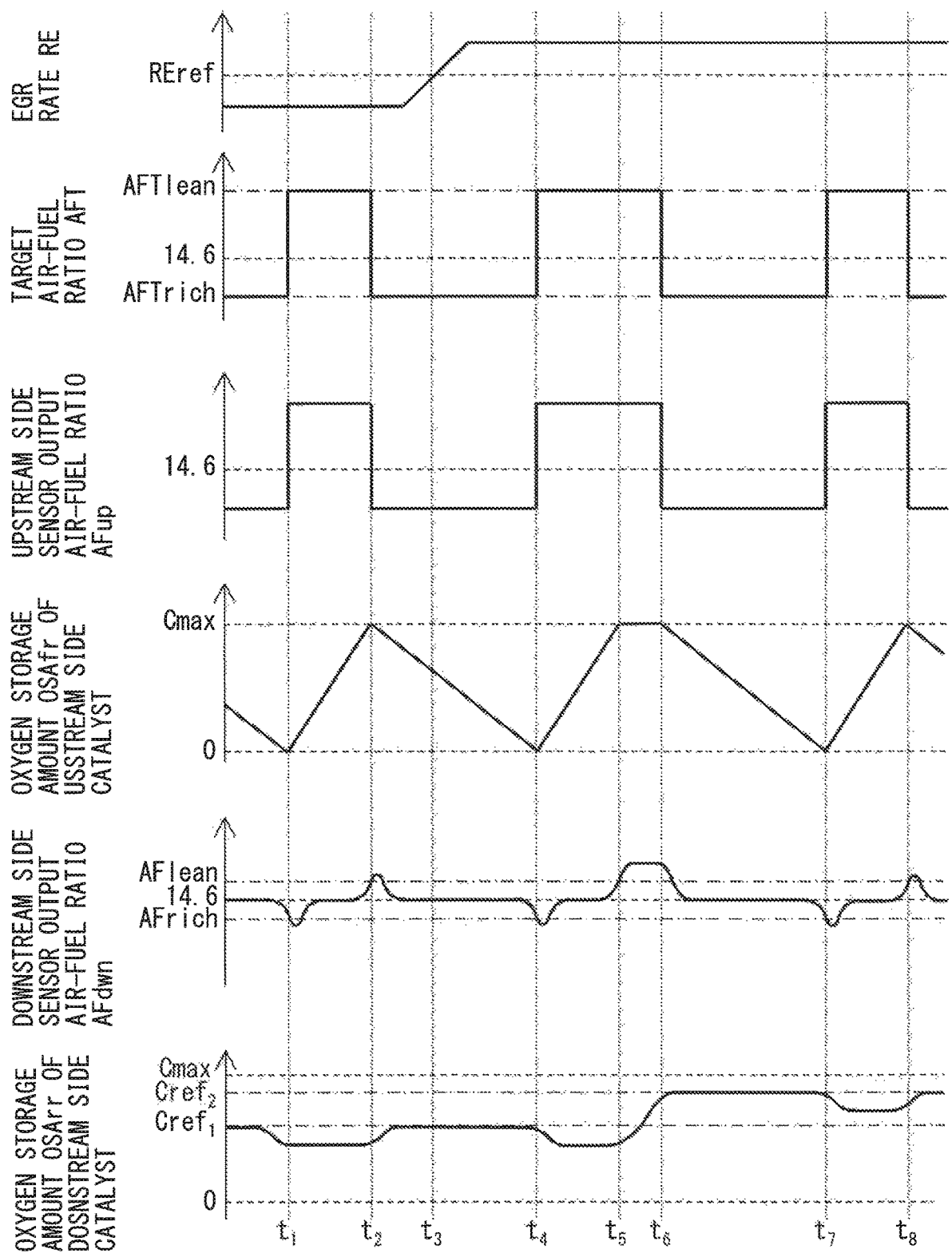
FIG. 16 is a time chart, similar to FIG. 15, of the EGR rate, etc., when performing air-fuel ratio control according to the third embodiment.

FIG. 16 is a time chart, similar to FIG. 15, of the EGR rate, etc., when performing the air-fuel ratio control according to the present embodiment. In the illustrated example, before the time $t_3$, the EGR rate RE is less than the reference EGR rate REref, while after the time $t_3$, the EGR rate RE is equal to or greater than the reference EGR rate REref.

As shown in FIG. 16, before the time $t_3$, the target air-fuel ratio AFT is alternately set to the rich set air-fuel ratio AFTrich and the lean set air-fuel ratio AFTlean so that the oxygen storage amount OSArr of the downstream side exhaust purification catalyst 24 becomes the first switching reference storage amount $Cref_1$, when the oxygen storage amount OSAfr of the upstream side exhaust purification catalyst 20 reaches near the maximum storable oxygen amount Cmax and thus exhaust gas of a rich air-fuel ratio flows out from the upstream side exhaust purification catalyst 20 (for example, near the time $t_2$).

On the other hand, if, at the time $t_3$, the EGR rate RE is equal to or greater than the reference EGR rate REref, the target air-fuel ratio AFT is alternately set to the rich set air-fuel ratio AFTrich and the lean set air-fuel ratio AFTlean so that the oxygen storage amount OSArr of the downstream side exhaust purification catalyst 24 becomes the second switching reference storage amount $Cref_2$ greater than the first switching reference storage amount $Cref_1$, when the oxygen storage amount OSAfr of the upstream side exhaust purification catalyst 20 reaches near the maximum storable oxygen amount Cmax and thus exhaust gas of a rich air-fuel ratio flows out from the upstream side exhaust purification catalyst 20.

Specifically, if after the time $t_3$, the output air-fuel ratio AFdwn of the downstream side air-fuel ratio sensor 41 reaches the rich judged air-fuel ratio AFrich, the target air-fuel ratio AFT is switched to the lean set air-fuel ratio AFTlean. Then, the oxygen storage amount OSAfr of the upstream side exhaust purification catalyst 20 gradually increases and, at the time $t_5$, the output air-fuel ratio AFdwn of the downstream side air-fuel ratio sensor 41 reaches the lean judged air-fuel ratio AFlean. However, if at this time the target air-fuel ratio AFT is switched from the lean set air-fuel ratio AFTlean to the rich set air-fuel ratio AFTrich, the oxygen storage amount OSArr of the downstream side exhaust purification catalyst 24 does not increase up to the second switching reference storage amount $Cref_2$.

Therefore, in the present embodiment, until the oxygen storage amount OSArr of the downstream side exhaust purification catalyst 24 reaches near the second switching reference storage amount $Cref_2$, even if the output air-fuel ratio AFdwn of the downstream side air-fuel ratio sensor 41 is equal to or greater than the lean judged air-fuel ratio AFlean, the target air-fuel ratio AFT is maintained at the lean set air-fuel ratio AFTlean. As a result, the oxygen storage amount OSArr of the downstream side exhaust purification catalyst 24 gradually increases and finally reaches near the second switching reference storage amount $Cref_2$ at the time $t_6$.

In the present embodiment, if the oxygen storage amount OSArr of the downstream side exhaust purification catalyst 24 reaches near the second switching reference storage amount $Cref_2$, the target air-fuel ratio AFT is switched to the rich set air-fuel ratio AFTrich. As a result, the air-fuel ratio of the exhaust gas flowing out from the upstream side exhaust purification catalyst 20 changes from a lean air-fuel ratio to the stoichiometric air-fuel ratio and, as a result, the oxygen storage amount OSArr of the downstream side exhaust purification catalyst 24 is maintained at the second switching reference storage amount $Cref_2$. Then, control similar to the control shown in FIG. 15 is performed. Accordingly, the oxygen storage amount OSArr of the downstream side exhaust purification catalyst 24 alternately changes between the second switching reference storage amount $Cref_2$ and the smaller predetermined amount.

Note that, in the present embodiment, then, when the EGR rate RE has become less than the reference EGR rate REref, even if the output air-fuel ratio AFdwn of the downstream side air-fuel ratio sensor 41 becomes equal to or less than the rich judged air-fuel ratio AFrich, the target air-fuel ratio AFT is temporarily maintained at the rich set air-fuel ratio AFTrich. As a result, it is possible to reduce the oxygen storage amount OSArr of the downstream side exhaust purification catalyst 24.

According to the present embodiment, when the EGR rate is high, it is maintained in a state with a large oxygen storage amount OSArr of the downstream side exhaust purification catalyst 24. As a result, HC poisoning of the downstream side exhaust purification catalyst 24 can be suppressed.

Note that, in the above embodiment, the switching reference storage amount Cref of the downstream side exhaust purification catalyst 24 is switched in two stages, based on whether the EGR rate is equal to or greater than the reference EGR rate. However, in the present embodiment as well, the switching reference storage amount Cref, etc., do not necessarily have to be switched in two stages. They may also be switched in multiple stages or, as shown in FIG. 9, may be switched continuously.

Summarizing the above, in the present embodiment, when the EGR rate is within a specific EGR rate region, the air-fuel ratio of the exhaust gas flowing into the downstream side exhaust purification catalyst 20 is controlled so that the air-fuel ratio of the exhaust gas flowing into the downstream side exhaust purification catalyst 20 is switched from the lean air-fuel ratio to the rich air-fuel ratio when the oxygen storage amount OSA of the downstream side exhaust purification catalyst 20 is larger when the EGR rate is relatively high, compared to when it is relative low.

Fourth Embodiment

Next, referring to FIGS. 17 and 18, an exhaust purification system according to a fourth embodiment will be explained. The configuration and control of the exhaust purification system according to the fourth embodiment are basically the same as the configuration and control in the exhaust purification systems according to the first to third embodiments, therefore below the parts different from the exhaust purification systems according to the first to third embodiments will be focused on in the explanation.

In the exhaust purification system according to the fourth embodiment, when EGR rate is less than a predetermined reference EGR rate within a specific EGR rate region, the target air-fuel ratio AFT is maintained constant at the stoichiometric air-fuel ratio. Therefore, at this time, the air-fuel ratio of the exhaust gas flowing into the upstream side exhaust purification catalyst 20 is controlled to be the stoichiometric air-fuel ratio.

On the other hand, when the EGR rate is equal to or greater than the reference EGR rate, active control is performed where the target air-fuel ratio AFT is alternately set to the rich air-fuel ratio and the lean air-fuel ratio. That is, in the present embodiment, when the EGR rate is equal to or greater than the reference EGR rate, the air-fuel ratio of the exhaust gas flowing into the upstream side exhaust purification catalyst 20 is controlled so as to alternately switch the air-fuel ratio of the exhaust gas flowing into the upstream side exhaust purification catalyst 20 between the rich air-fuel ratio and the lean air-fuel ratio. As the active control performed at this time, any one of the control shown in FIG. 3, the control shown in FIG. 11, and the control shown in FIG. 15 may be performed.

Figure 17:
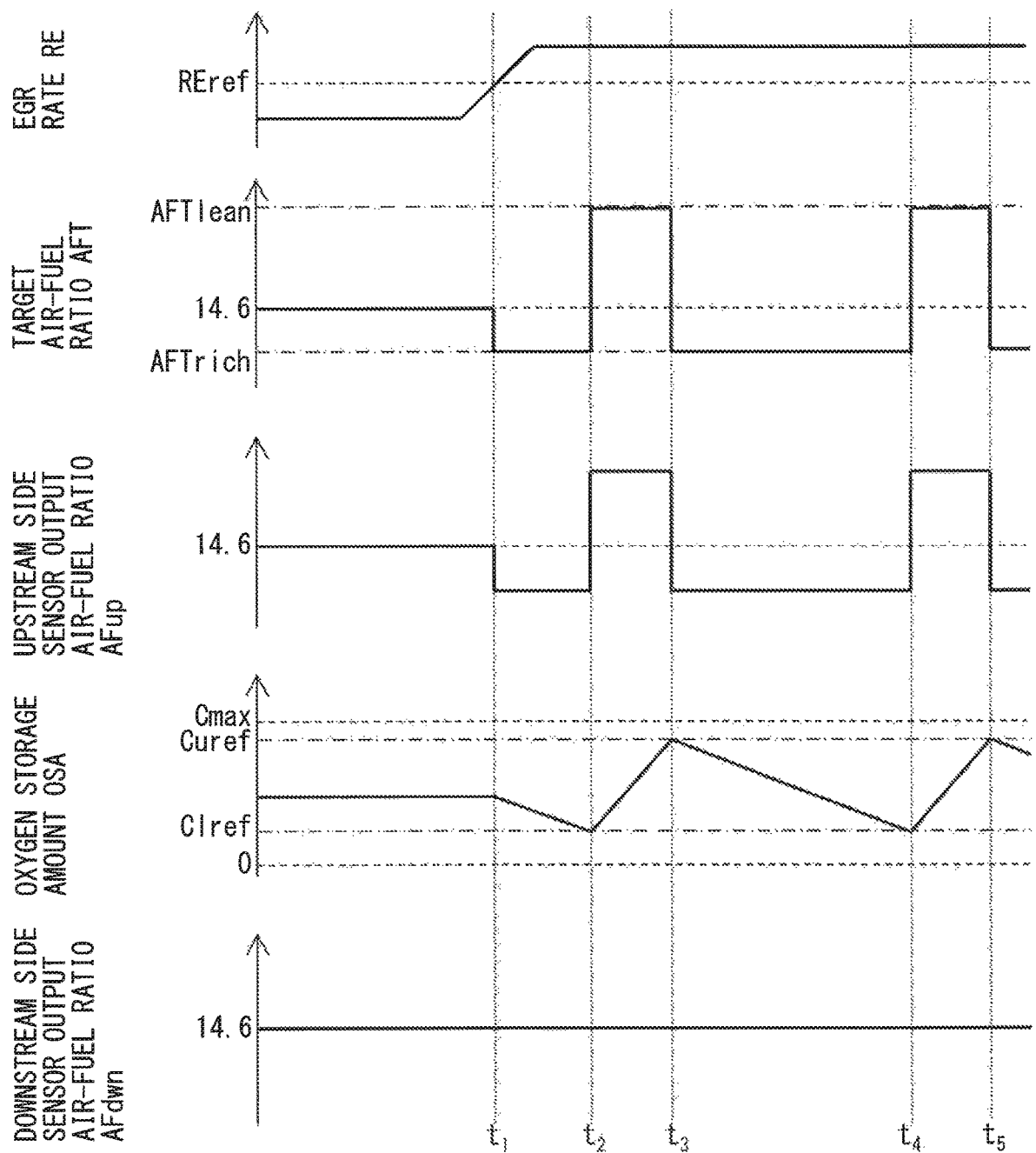
FIG. 17 is a time chart, similar to FIG. 13, of the EGR rate, etc., when performing air-fuel ratio control according to a fourth embodiment.

FIG. 17 is a time chart, similar to FIG. 13, of the EGR rate, etc., when performing air-fuel ratio control according to the present embodiment. In the illustrated example, before the time $t_1$, the EGR rate RE is less than the reference EGR rate REref, while after the time $t_1$, the EGR rate RE is equal to or greater than the reference EGR rate REref. Further, in the example shown in FIG. 17, as active control, the case is shown of performing control such as shown in FIG. 11.

As shown in FIG. 17, before the time $t_1$ when the EGR rate RE is less than the reference EGR rate REref, the target air-fuel ratio AFT is maintained constant at the stoichiometric air-fuel ratio. Therefore, the oxygen storage amount OSA of the upstream side exhaust purification catalyst 20 is also maintained constant.

On the other hand, if, at the time $t_1$, the EGR rate RE becomes equal to or greater than the reference EGR rate REref, active control is started. In the example shown in FIG. 17, at the time $t_1$, the target air-fuel ratio AFT is set to the rich set air-fuel ratio AFTrich. Then, at the time $t_2$, if the oxygen storage amount OSA of the upstream side exhaust purification catalyst 20 reaches the lower limit storage amount Clref, the target air-fuel ratio AFT is switched to the lean set air-fuel ratio AFTlean. Further, if, at the time $t_3$, the oxygen storage amount OSA of the upstream side exhaust purification catalyst 20 reaches the upper limit storage amount Curef, the target air-fuel ratio AFT is switched to the rich set air-fuel ratio AFTrich. While the EGR rate RE is equal to or greater than the reference EGR rate REref, the active control is continued.

According to the present embodiment, when the EGR rate is equal to or less than the medium extent and thus HC poisoning is hard to occur, the target air-fuel ratio is maintained constant. As a result, the oxygen storage amount OSA of the upstream side exhaust purification catalyst 20 is also maintained constant to a medium extent. On the other hand, when the EGR rate is high and thus HC poisoning easily occurs, active control is performed. As a result, compared to when the EGR rate is low, the maximum value of the oxygen storage amount OSA of the upstream side exhaust purification catalyst 20 is increased and accordingly HC poisoning of the upstream side exhaust purification catalyst 20 can be suppressed.

Figure 18:
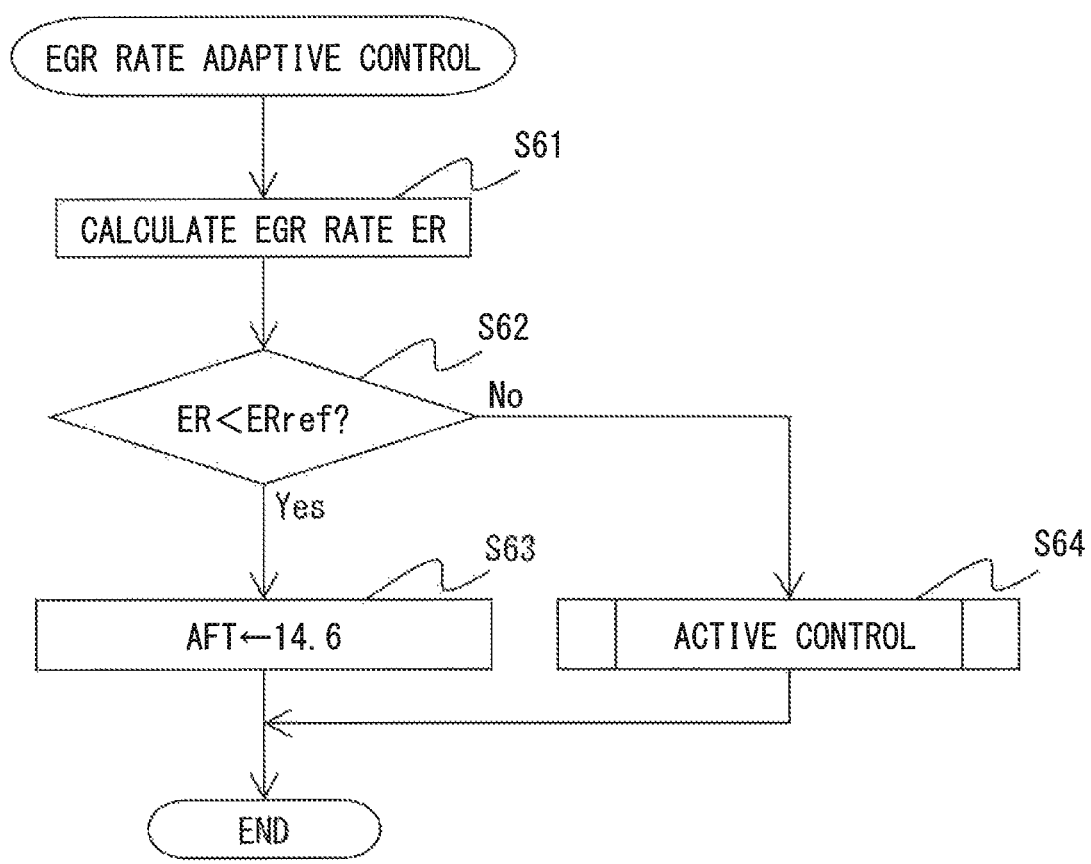
FIG. 18 is a flow chart showing a control routine of EGR rate adaptive control for changing a method of setting a target air-fuel ratio in accordance with the EGR rate.

FIG. 18 is a flow chart showing a control routine of EGR rate adaptive control for changing the method of setting the target air-fuel ratio in accordance with the EGR rate. The illustrated control routine is executed at constant time intervals.

First, at step S61, the EGR rate RE is calculated. Next, at step S62, it is judged if the EGR rate RE calculated at step S61 is less than a reference EGR rate REref. If it is judged that the EGR rate RE is less than the reference EGR rate REref, the routine proceeds to step S63. At step S63, the target air-fuel ratio is set to the stoichiometric air-fuel ratio and the control routine is ended. On the other hand, if at step S62 it is judged that the EGR rate RE is equal to or greater than the reference EGR rate REref, the routine proceeds to step S64. At step S64, active control is performed. Specifically, the control routine shown in FIG. 4 or FIG. 12 is used to set the target air-fuel ratio.

Note that, as the active control of the present embodiment, it is also possible to perform control according to the above-mentioned first to third embodiments. Therefore, for example, during active control, it is also possible to make the switching reference storage amount change according to the EGR rate.

1. engine body
5. combustion chamber
7. intake port
9. exhaust port
19. exhaust manifold
20. upstream side exhaust purification catalyst
24. downstream side exhaust purification catalyst
25. EGR passage 26. EGR control valve
31. ECU
40. upstream side air-fuel ratio sensor
41. downstream side air-fuel ratio sensor
46. NO$_X$ sensor

The invention claimed is:

1. An exhaust purification system of an internal combustion engine, comprising: an exhaust purification catalyst arranged in an exhaust passage of the internal combustion engine and able to store oxygen; and a control device for calculating an EGR rate of intake gas supplied to a combustion chamber of the internal combustion engine and for controlling an air-fuel ratio of the exhaust gas flowing into the exhaust purification catalyst,
wherein the control device is configured to:
alternately switch the air-fuel ratio of the exhaust gas flowing into the exhaust purification catalyst between a rich air-fuel ratio richer than the stoichiometric air-fuel ratio and a lean air-fuel ratio leaner than the stoichiometric air-fuel ratio; and
control the air-fuel ratio of the exhaust gas flowing into the exhaust purification catalyst so that, in a predetermined EGR rate region where a concentration of HC discharged from a body of the engine becomes higher along with an increase of the EGR rate, the air-fuel ratio of the exhaust gas flowing into the exhaust purification catalyst is switched from the lean air-fuel ratio to the rich air-fuel ratio at a higher oxygen storage amount of the exhaust purification catalyst when the calculated EGR rate is higher as compared to when the calculated EGR rate is lower.

2. The exhaust purification system of an internal combustion engine according to claim 1, wherein the control device is configured to control the air-fuel ratio of the exhaust gas flowing into the exhaust purification catalyst to a larger lean degree when the calculated EGR rate is higher as compared to when the calculated EGR rate is lower in the predetermined EGR rate region.

3. The exhaust purification system of an internal combustion engine according to claim 1, wherein the control device is configured to control the air-fuel ratio of the exhaust gas flowing into the exhaust purification catalyst so that each duration time when the air-fuel ratio of the exhaust gas flowing into the exhaust purification catalyst is a lean air-fuel ratio is longer when the calculated EGR rate is higher as compared to when the calculated EGR rate is lower, in the predetermined EGR rate region.

4. The exhaust purification system of an internal combustion engine according to claim 2, wherein the control device is configured to control the air-fuel ratio of the exhaust gas flowing into the exhaust purification catalyst so that each duration time when the air-fuel ratio of the exhaust gas flowing into the exhaust purification catalyst is a lean air-fuel ratio is longer when the calculated EGR rate is higher as compared to when the calculated EGR rate is lower, in the predetermined EGR rate region.

5. An exhaust purification system of an internal combustion engine, comprising: an exhaust purification catalyst arranged in an exhaust passage of the internal combustion engine and able to store oxygen; and a control device for calculating an EGR rate of intake gas supplied to a combustion chamber of the internal combustion engine and for controlling an air-fuel ratio of the exhaust gas flowing into the exhaust purification catalyst,
wherein the control device is configured to:
control the air-fuel ratio of the exhaust gas flowing into the exhaust purification catalyst to the stoichiometric air-fuel ratio when the calculated EGR rate is lower than a predetermined reference EGR rate in a predetermined EGR rate region where a concentration of HC discharged from a body of the engine becomes higher along with an increase of the EGR rate; and
control the air-fuel ratio of the exhaust gas flowing into the exhaust purification catalyst so as to alternately switch the air-fuel ratio of the exhaust gas flowing into the exhaust purification catalyst between a rich air-fuel ratio richer than the stoichiometric air-fuel ratio and a lean air-fuel ratio leaner than the stoichiometric air-fuel ratio, when the calculated EGR rate is equal to or greater than the predetermined reference EGR rate.

* * * * *